(12) United States Patent
Shiraiwa et al.

(10) Patent No.: US 7,158,144 B2
(45) Date of Patent: Jan. 2, 2007

(54) IMAGE PROCESSING APPARATUS AND METHOD FOR CONVERTING DATA DEPENDENT ON A FIRST ILLUMINATING LIGHT INTO DATA DEPENDENT ON A SECOND ILLUMINATING LIGHT

(75) Inventors: Yoshinobu Shiraiwa, Machida (JP); Toshiyuki Mizuno, Yokohama (JP); Yumiko Ohsaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/111,731

(22) Filed: Jul. 8, 1998

(65) Prior Publication Data
US 2001/0040588 A1     Nov. 15, 2001

(30) Foreign Application Priority Data
Jul. 9, 1997  (JP) .................................. 9-183697
Jul. 24, 1997 (JP) .................................. 9-198341

(51) Int. Cl.
G09G 5/02   (2006.01)
G09G 5/10   (2006.01)
G03F 3/08   (2006.01)

(52) U.S. Cl. ........................ 345/589; 345/690; 358/518
(58) Field of Classification Search ................ 345/426, 345/432, 153, 147, 154, 589, 690, 693; 358/518
See application file for complete search history.

(56) References Cited

U.S. PATENT DOCUMENTS

| | | | | |
|---|---|---|---|---|
| 4,992,963 A | | 2/1991 | Funt et al. ................... | 364/526 |
| 5,081,529 A | * | 1/1992 | Collette ........................ | 358/504 |
| 5,313,291 A | * | 5/1994 | Appel et al. ................. | 358/501 |
| 5,446,476 A | * | 8/1995 | Kouzaki ....................... | 347/232 |
| 5,546,195 A | | 8/1996 | Arai ............................. | 358/518 |
| 5,566,283 A | * | 10/1996 | Modegi et al. .............. | 345/426 |
| 5,604,610 A | | 2/1997 | Spaulding et al. ........... | 358/525 |
| 5,710,876 A | * | 1/1998 | Peercy et al. ................ | 345/426 |
| 5,892,585 A | * | 4/1999 | Lianza et al. ................ | 356/405 |
| 5,905,503 A | * | 5/1999 | Penna .......................... | 345/426 |
| 5,956,015 A | * | 9/1999 | Hino ............................ | 345/153 |

(Continued)

FOREIGN PATENT DOCUMENTS

EP          0 531 891          3/1993

(Continued)

OTHER PUBLICATIONS

"Invited Address: White-Point Transformations And Color Data Interchange", by R.R. Buckley, P.B. Roetling, SID International Symposium Digest of Papers, vol. 23, pp. 560-563, May 17, 1992.

(Continued)

Primary Examiner—Jeffery A. Brier
(74) Attorney, Agent, or Firm—Fitzpatrick, Cella, Harper & Scinto

(57) ABSTRACT

An image processing method converts data dependent on a first illuminating light into data dependent on a second illuminating light by, storing conversion conditions for plural illuminating light sources of different color rendering properties, generating data indicating the proportion of synthesis of the stored conversion conditions of the plural light sources, corresponding to the second illuminating light, generating a first conversion condition from the stored conversion conditions for the plural illuminating light sources according to the data indicating the proportion of synthesis, generating a second conversion condition for color temperature conversion based on color temperature information from the second illuminating light, and converting data dependent on the first illuminating light into data dependent on the second illuminating light using the first and second conversion conditions.

9 Claims, 27 Drawing Sheets

U.S. PATENT DOCUMENTS 5,977,946 A * 11/1999 Mizobata ..................... 345/112
6,018,350 A * 1/2000 Lee et al. .................... 345/426

FOREIGN PATENT DOCUMENTS

| EP | 0 624 028 | 11/1994 |
| EP | 0 669 754 | 8/1995 |
| EP | 0 767 445 | 4/1997 |
| WO | WO 92/17982 | 10/1992 |

OTHER PUBLICATIONS

"Practical Method For Appearance Match Between Soft Copy And Hard Copy", by Naoya Katoh, Proceedings Of The SPIE, vol. 2170, pp. 170-181, Feb. 7, 1994.

* cited by examiner

OBSERVATION ENVIRONMENT OF IMAGE

IMAGE PROCESSING APPARATUS AND METHOD FOR CONVERTING DATA DEPENDENT ON A FIRST ILLUMINATING LIGHT INTO DATA DEPENDENT ON A SECOND ILLUMINATING LIGHT

BACKGROUND OF THE INVENTION

1. Field of the Invention

The present invention relates to an image processing apparatus capable of estimating and correcting color data which vary according to the illuminating light, and a method and a recording medium therefor.

2. Related Background Art

Utilizing the spectral reflectance $R(\lambda)$ of a reflective object, the spectral distribution $P(\lambda)$ of the illuminating light and the isochromatic functions:

$$\bar{x}(\lambda), \bar{y}(\lambda), \bar{z}(\lambda) \qquad \text{A}$$

the colorimetric values (X, Y, Z; three stimulation values) of the reflective object under certain illuminating light can be represented by:

$$X = k \int_{vis} R(\lambda) \cdot P(\lambda) \cdot \bar{x}(\lambda) d\lambda$$

$$Y = k \int_{vis} R(\lambda) \cdot P(\lambda) \cdot \bar{y}(\lambda) d\lambda$$

$$Z = k \int_{vis} R(\lambda) \cdot P(\lambda) \cdot \bar{z}(\lambda) d\lambda \qquad \text{B}$$

wherein the constant k is represented by:

$$k = 100 / \int_{vis} P(\lambda) \cdot \bar{y}(\lambda) d\lambda \qquad \text{C}$$

and the integration:

$$(\int_{vis}) \qquad \text{D}$$

is executed within the visible wavelength range.

Consequently the calorimetric values of the reflective object vary according to the variation of the illuminating light. Also according to the definitions described above, the spectral distribution $P(\lambda)$ of the illuminating light and the spectral reflectance distribution $R(\lambda)$ are required in order to obtain the exact calorimetric values in such state.

For this reason, the colorimetric values of the reflective object under arbitrary illuminating light have conventionally been determined from the spectral reflectance $R(\lambda)$ of the reflective object and the spectral distribution $P(\lambda)$ of the illuminating light.

The above-mentioned method can be easily executed and can determine the exact calorimetric values in case the reflective object consists of areas of several colors (spectral reflectance $R(\lambda)$). On the other hand, in case the reflective object is for example an image, the object in general has color information in each of finely divided many areas (pixels). Consequently there is required a large memory capacity for storing spectral reflectance $R(\lambda)$ for each pixel, and the information ordinarily held for each pixel is the chromaticity values (X, Y, Z) under a specified condition (specifying illuminating light or colorimetric method) or equivalent RGB chromaticity values. In order to determine the calorimetric values of the reflective object for the arbitrary illuminating light in the above-described method, there is required the spectral reflectance $R(\lambda)$ for each pixel, so that the spectral reflectance $R(\lambda)$ is determined again from the information corresponding to the aforementioned colorimetric values (X, Y, Z) for each pixel or the spectral reflectance $R(\lambda)$ is measured again for each pixel.

In case the information obtained for each pixel is the values corresponding to the colorimetric values (such as the aforementioned XYZ values of RGB values) under a specified condition, the colorimetric values of the reflective object under arbitrary illuminating light can be determined, in addition to the above-described method according to the foregoing definitions based on the spectral reflectance $R(\lambda)$ of the object and the spectral distribution $P(\lambda)$ of the illuminating light, by a method of directly converting the information for each pixel, corresponding to the colorimetric values under the specified condition, into the colorimetric values under the arbitrary illuminating light utilizing a matrix, a three-dimensional look-up table or a neural network. The conversion function (above-mentioned matrix, three-dimensional look-up table or neural network) is determined for each of the required plural illuminating lights.

As explained in the foregoing, the calorimetric values of the reflective object vary according the change in the illuminating light. In an image reproducing process or the like, there are often required the calorimetric values of the reflective object under arbitrary illuminating light.

In case the information obtained for each pixel is the values corresponding to the colorimetric values (such as the aforementioned XYZ values of RGB values) under a specified condition, the calorimetric values of the reflective object under arbitrary illuminating light can be determined by a method of directly converting the information for each pixel, corresponding to the calorimetric values under the specified condition, into the calorimetric values under the arbitrary illuminating light utilizing a matrix, a three-dimensional look-up table or a neural network. The conversion function (above-mentioned matrix, three-dimensional look-up table or neural network) is determined for each of the required plural illuminating lights.

The above-described method is acceptable in case the number of the required illuminating lights is limited. However, for example in the ordinary office environment, the condition of lighting changes in various manner according to the kind of the illuminating light source, the time-dependent change thereof, and the change in the state of the incoming external light such as the solar light, and it is difficult to prepare or store in advance the conversion functions required corresponding to such changes.

As explained in the foregoing, in order to determine the calorimetric values under arbitrary illuminating light for an image or the like that requires information for each of a large number of pixels, the conventional methods have been associated with drawbacks of requiring a large amount of information such as preparing the spectral reflectance for each pixel or preparing a large number of conversion functions corresponding to various illuminating light conditions.

On the other hand, owing to the recent commercialization of various color image processing equipment, the color images can be handily processed not only in the special fields such as designing based on the computer graphics but also in the ordinary offices. It has however been difficult to consider the color of the printout on the monitor, because the color of the image prepared on the monitor does not in general match that of the printout obtained from the printer. In order to solve such drawback, there has been considered and proposed the color management system.

The color management system is to cancel the difference in color between the different devices by employing a common color space. This system is based on a principle that a color described by same coordinate values in a same color space should always look same and is to match the apparent color by representing all the colors in a common color space and matching the coordinate values. One of the currently employed methods for canceling the difference between the devices employs the CIE-XYZ color space and utilizes the XYZ stimulation values which are the internal description coordinates therein.

However such method may still be insufficient in case the media used for reproduction are different, for example the image on a monitor and the printed image. FIG. 27 shows the environment for observing an image on a monitor and a printout. In the following it is assumed that an image 1202 same as that on a print 1201 is displayed on a monitor 1203.

The printed image or the image displayed on the monitor is not observed under constant ambient light, but the ambient light 1204 shown in FIG. 27 changes by the opening or closing of a window or the replacement of the illuminating light source, and the image appears differently by such change. Consequently, even when isochromaticity can be obtained under certain ambient light, it cannot be preserved even under the same conditions in case the ambient lighting condition is altered.

Though the foregoing consideration has been explained in the comparison of the printed image and the image displayed on the monitor, it is generally applicable to the comparison of a color presentation by reflecting illuminating light and a light-emitting color presentation. More specifically, such phenomenon occurs also in case of taking an object such as a person or a sculpture and displaying it on a monitor or presenting as a transmissive display.

As explained in the foregoing, the appearance of the image varies according the change in the image observing environment. In the conventional art employing different media, the images providing isochromaticity under a certain situation no longer provide isochromatic feeling by the change in the image observing environment.

SUMMARY OF THE INVENTION

An object of the present invention is to obtain data under desired illumination in a simple manner with a limited memory capacity.

The above-mentioned object can be attained, according to the present invention, by an image processing method for converting data dependent on a first illuminating light into data dependent on a second illuminating light, the method comprising steps of storing conversion data for plural illuminating lights of different characteristics, generating data corresponding to the second illuminating light and indicating the proportion of synthesis of the plural illuminating lights of the different characteristics, and converting the data dependent on the first illuminating light into those dependent on the second illuminating light, based on the conversion data of the plural illuminating lights of different characteristics and on the data indicating the proportion of synthesis.

Another object of the present invention is to compensate the appearance of the color of the displayed image regardless of the observing environment.

Still another object of the present invention is to provide a user interface allowing easy setting of the correction for the ambient light.

The above-mentioned objects can be attained, according to the present invention, by an image processing method comprising steps of:

setting a coefficient indicating the ambient illuminating light characteristics according a manual instruction;

entering image data dependent on an input device; and effecting correction for the ambient light on the entered image data based on the input device, a display device and the ambient illuminating light characteristics coefficient, thereby achieving conversion to image data dependent on the display device.

Still other objects of the present invention, and the features thereof, will become fully apparent from the following description which is to be taken in conjunction with the attached drawings.

DESCRIPTION OF THE PREFERRED EMBODIMENTS

Embodiment 1

Figure 1:
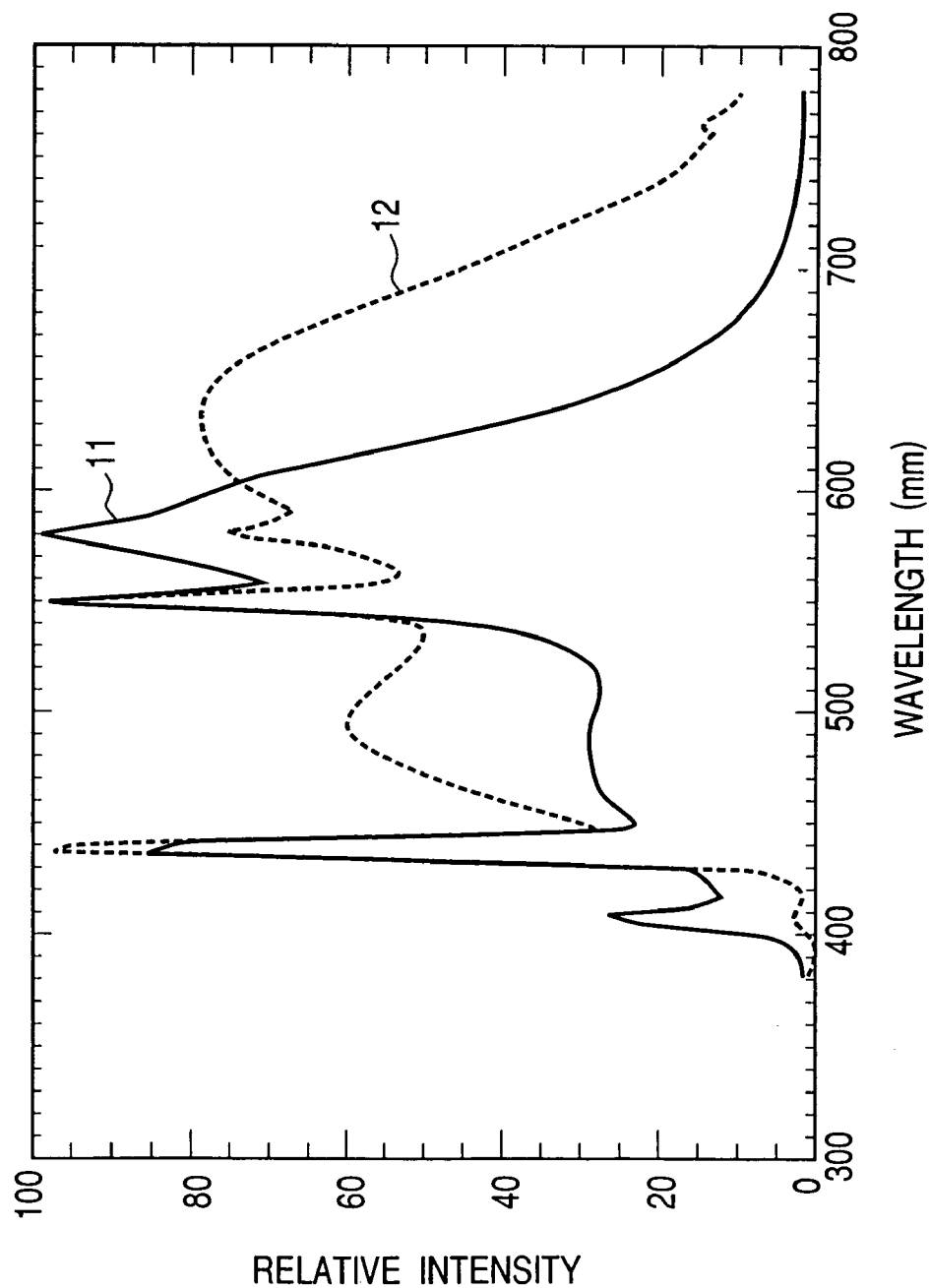
FIG. 1 is a chart showing spectral characteristics of light sources of different spectral distributions.
Figure 2:
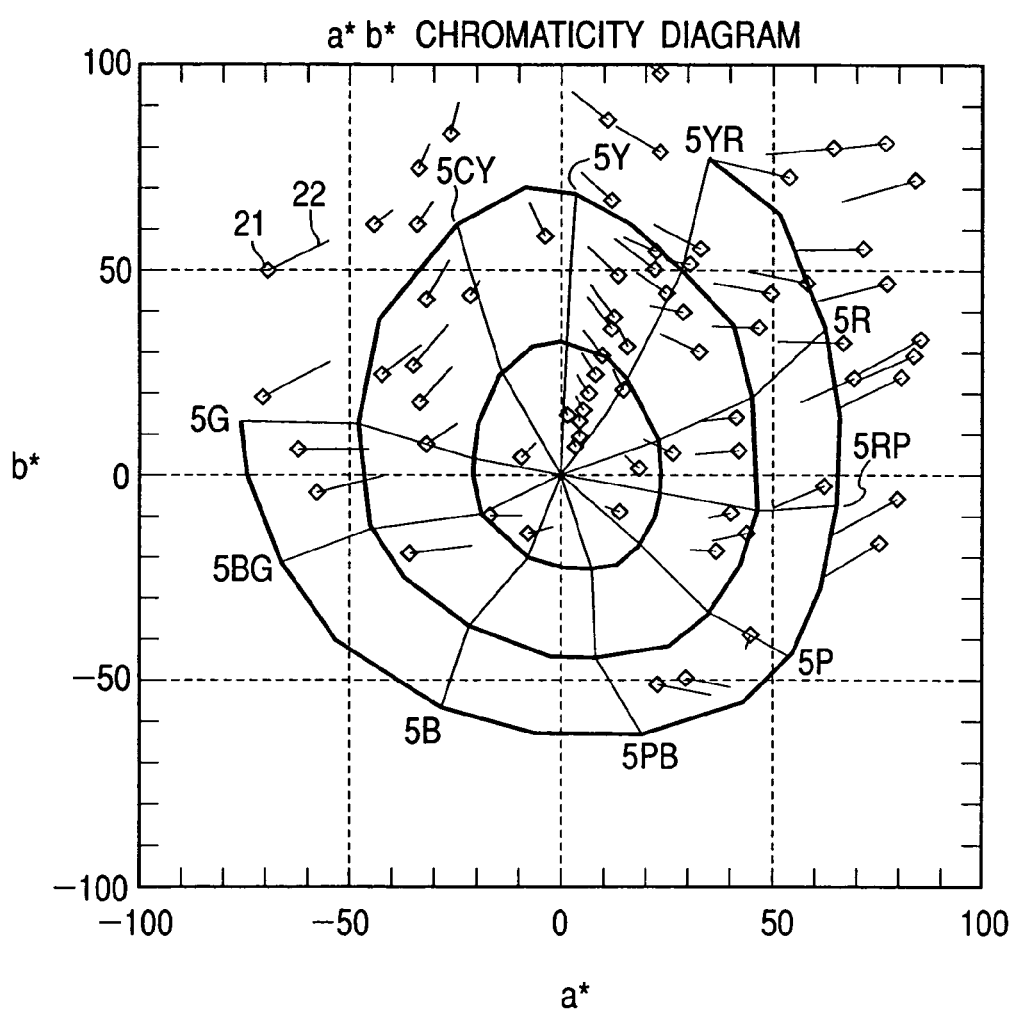
FIG. 2 is a chart showing examples of colorimetric values (a*, b*) of a same reflective object illuminated by the light sources of different spectral distribution characteristics.

At first there will be explained the principle of estimating the colorimetric values of the reflective object, to be employed in the following embodiments. For converting three stimulation values under certain illuminating light into those under another illuminating light, there is known, for example, a conversion method corresponding to the change in the color temperature, such as the color adaptation conversion (such as the method of von Kries). However, as often felt in the image observation under the natural daylight and under the daylight type fluorescent lamp, certain colors may be felt differently even if the color temperature is same. Also certain colors may be felt different even if the isochromaticity is attained by the color adaptation conversion for the colors close to the achromatic color. Such phenomena are assumed to result from the spectral distribution characteristics of the illuminating light, and the evaluating method therefor is already known, for example the method of evaluating the color rendering of the light source according to JIS-Z-8726 (1990). FIG. 1 shows examples of the light sources substantially same in the color temperature but different in the spectral distribution. In FIG. 1, a curve 11 indicates the spectral distribution of a white, ordinary fluorescent lamp while a curve 12 indicates that of a white, high color rendering fluorescent lamp. FIG. 2 shows the calorimetric values of a same reflective object, illuminated by the two light sources shown in FIG. 1. In FIG. 2, square marks 21 indicate the calorimetric values corresponding to the illuminating light of the spectral characteristics 12 in FIG. 1, and the ends 22 of line segments corresponding to that of the characteristics 11 in FIG. 1.

The method for estimating the calorimetric values of the reflective object to be employed in the following embodiments serves to estimate and correct the difference of color, resulting from the difference in the spectral distribution characteristics of the illuminating light.

In this method, a lighting characteristic matrix CR, defined by the following equation:

$$CR = IH_{ks} \cdot CR_{hr} + (1 - IH_{ks}) \cdot CR_{hl} \qquad \text{E}$$

is utilized as means for estimating and correcting the difference of color, resulting from the difference in the spectral distribution characteristics of the illuminating light.

In the above-mentioned equation, $CR_{hr}$ is a lighting characteristic matrix corresponding to the natural daylight, the incandescent lamp or the illuminating light, obtained from a standard light source defined in the Japan Industrial Standards or a light source of satisfactory color rendering such as a high color-rendering fluorescent lamp.

$CR_{hl}$ is a lighting characteristic matrix corresponding to the illuminating light obtained from a light source of low color rendering, as defined in the Japan Industrial Standards, such as an ordinary fluorescent lamp.

Also $IH_{ks}$ is a lighting characteristic coefficient, assuming a value between 0 and 1.

In case $IH_{ks}=1$, CR coincides with $CR_{hr}$. The matrix obtained in this case corresponds to the illuminating light of satisfactory color rendering, such as the natural daylight, the incandescent lamp, the JIS defined standard light source of the JIS defined high color rendering fluorescent lamp.

In case $IH_{ks}=0$, CR coincides with $CR_{hl}$. In this case, the matrix corresponds the illuminating light of low color rendering, such as the JIS defined ordinary fluorescent lamp.

In case $0<IH_{ks}<1$, the lighting characteristic matrix CR corresponds to the illuminating light obtained by mixing $CR_{hr}$ and $CR_{hl}$ with a mixing ratio $IH_{ks}$.

In this manner it is rendered possible to generate the lighting characteristic matrix corresponding to the illuminating lights of various color rendering properties, based on the lighting characteristic matrixes corresponding to the illuminating lights of different color rendering properties.

Figure 3:
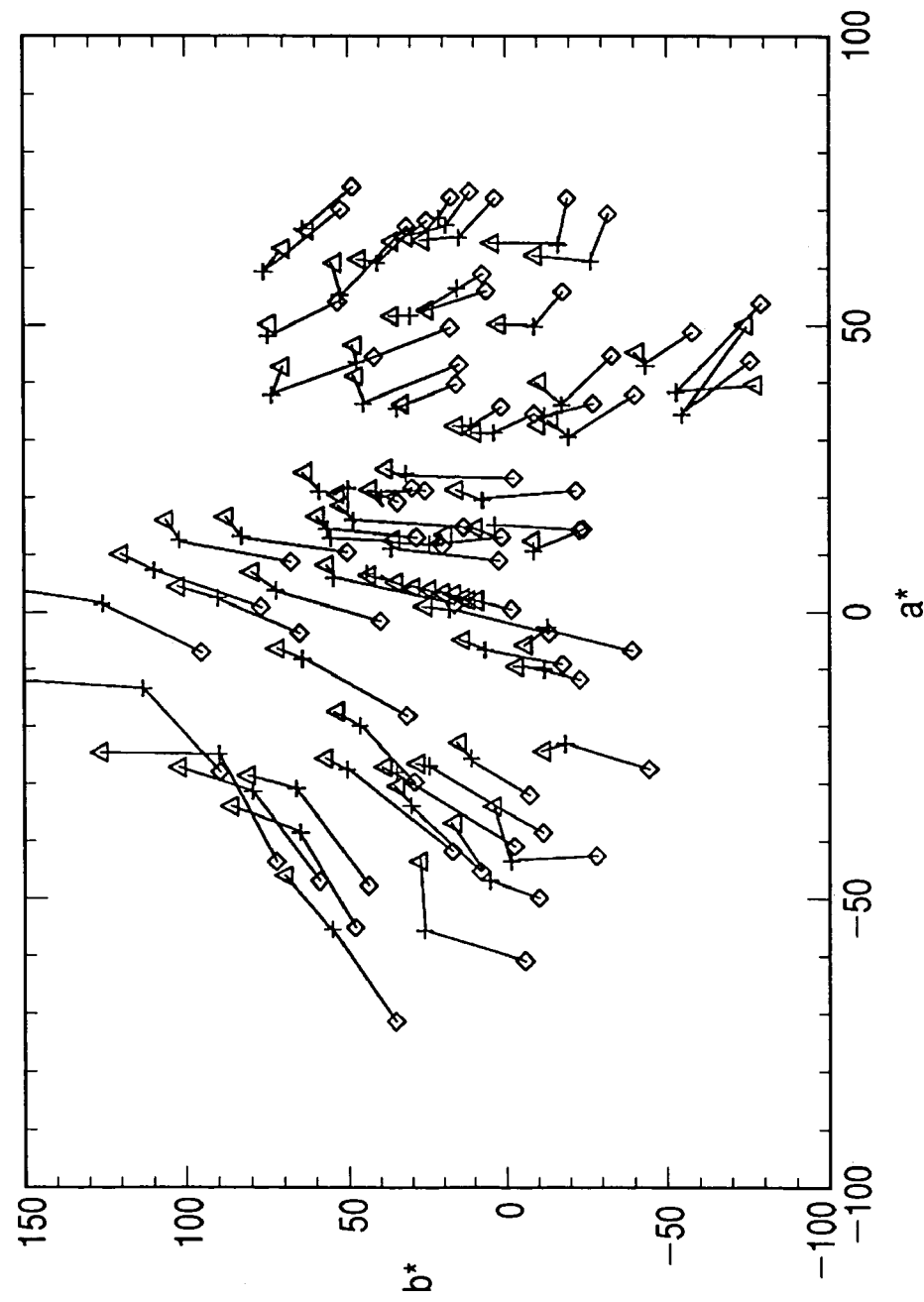
FIGS. 3, 4 and 5 are charts showing examples of the result obtained by the algorithm of the present invention.
Figure 4:
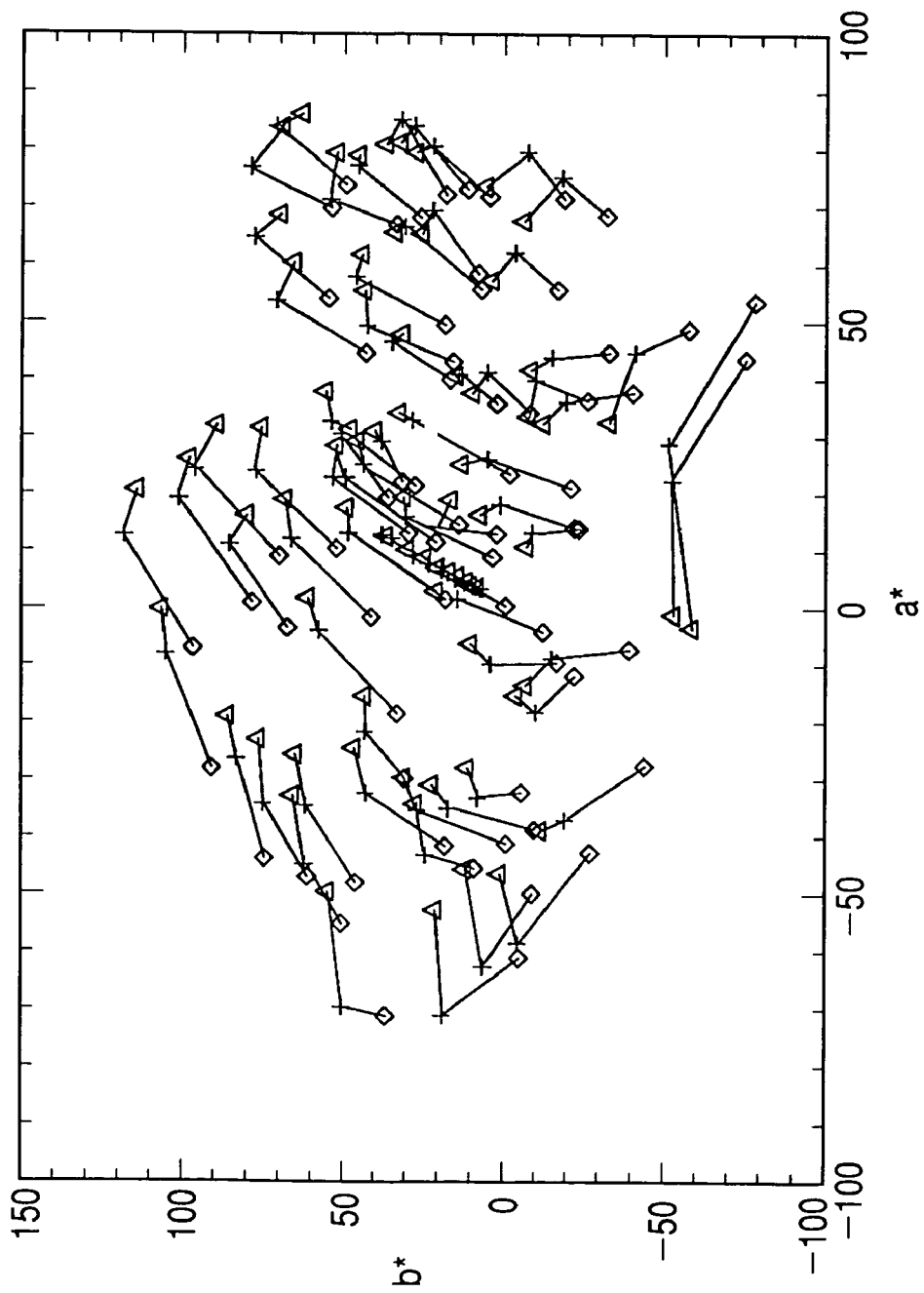
Figure 5:
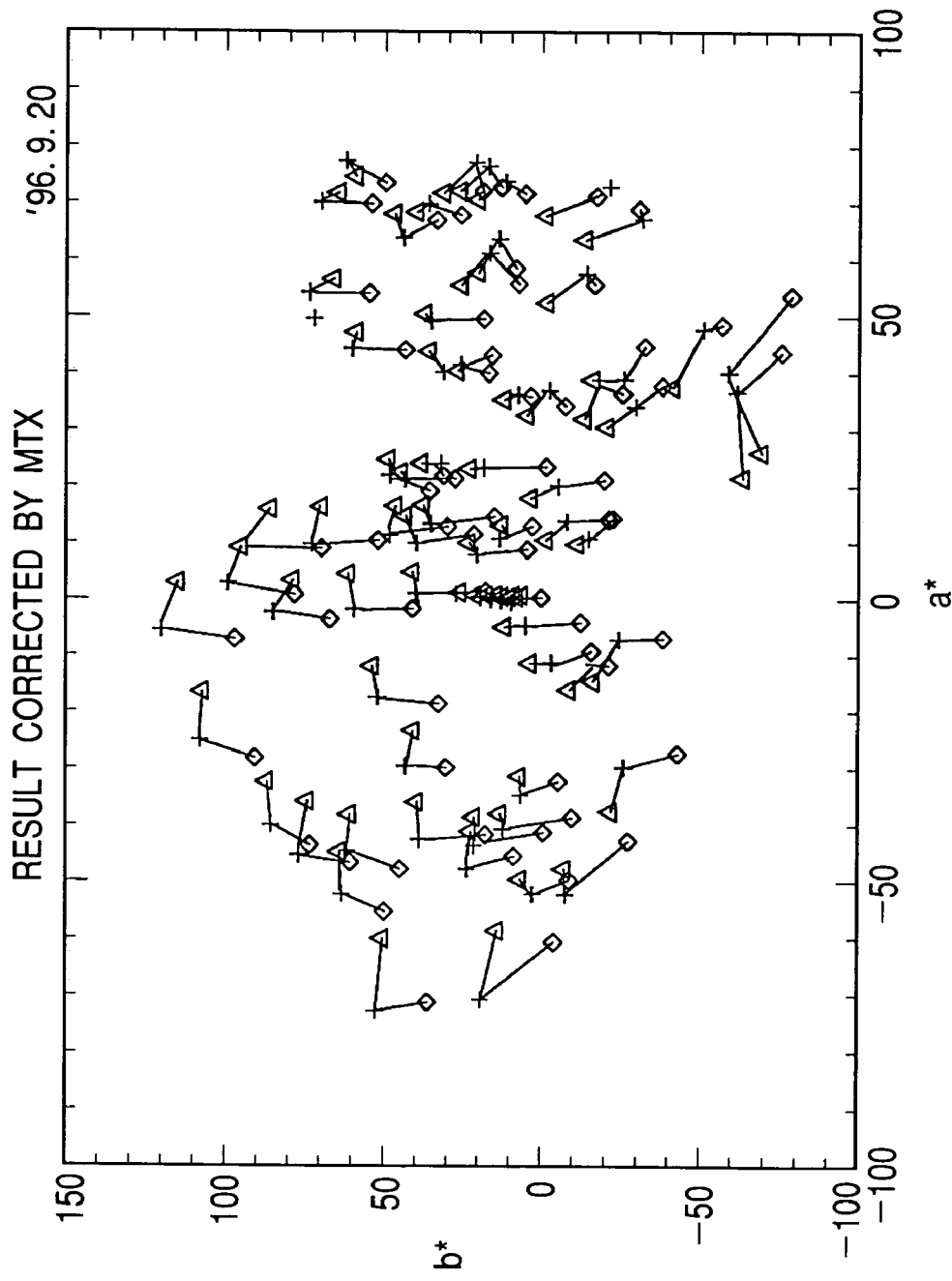

FIGS. 3, 4 and 5 show the results of estimation of the calorimetric values under arbitrary illuminating light, utilizing those under a certain specified condition. In the illustrated cases, the high color rendering illumination of daylight color is used as the specified condition. As the arbitrary illuminating light, the case shown in FIG. 3 employs an ordinary white fluorescent lamp (light source of low color rendering), while the case in FIG. 4 employs a high color rendering white fluorescent lamp (light source of high color rendering), and the case in FIG. 5 employs a daylight white fluorescent lamp of three-wavelength type (light source of medium color rendering). In these drawings, square marks indicate the calorimetric values of pixels under the above-mentioned specified condition, while crosses indicate the actually measured colorimetric values under the arbitrary illuminating light and triangles indicates the estimated calorimetric values.

Figure 6:
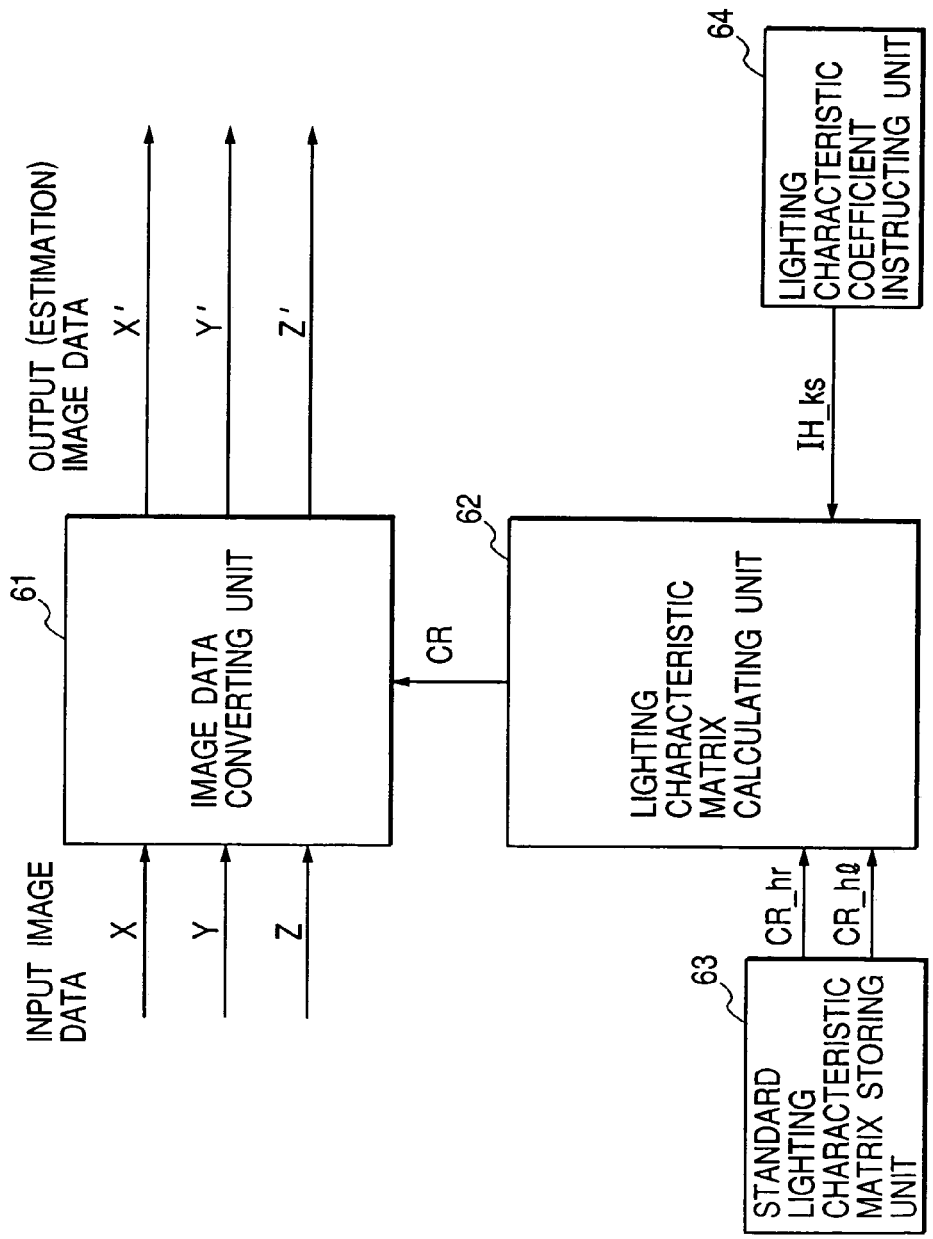
FIG. 6 is a view showing an example of the colorimetric value estimating system.

FIG. 6 shows an example of the flow of the calorimetric value estimating process utilizing the estimating method described above. The estimating process can be realized through execution of different process units shown in FIG. 6, by a CPU according to a program stored in a memory medium and adapted to execute the different process units.

An image data conversion unit 61 converts the input image data XYZ into estimated image data X'Y'Z' under an arbitrary light source according to the following equation, utilizing the lighting characteristic matrix CR calculated in an illuminating light characteristic matrix calculation unit 62, wherein the input pixel data XYZ are normalized to the values under a high color rendering light source of a color temperature of 6500°:

$$\begin{bmatrix} X' \\ Y' \\ Z' \end{bmatrix} = CR \begin{bmatrix} X \\ Y \\ Z \end{bmatrix} \qquad \text{F}$$

The lighting characteristic matrix CR is calculated, in the lighting characteristic matrix calculation unit 62, according to the following equation:

$$CR = IH_{ks} \cdot CR_{hr} + (1 - IH_{ks}) \cdot CR_{hl} \qquad \text{G}$$

based on the lighting characteristic matrix $CR_{hr}$ stored in a standard lighting characteristic matrix storing unit 63 and corresponding to the illuminating light obtained from the light source of high color rendering such as the natural daylight, incandescent lamp, JIS-defined standard light source or JIS-defined high color rendering fluorescent lamp, the lighting characteristic matrix $CR_{hl}$ corresponding to the illuminating light obtained from the light source low color rendering such as the JIS-defined ordinary fluorescent lamp and a lighting characteristic coefficient $IH_{ks}$ given by a lighting characteristic coefficient instructing unit 64.

Figure 7:
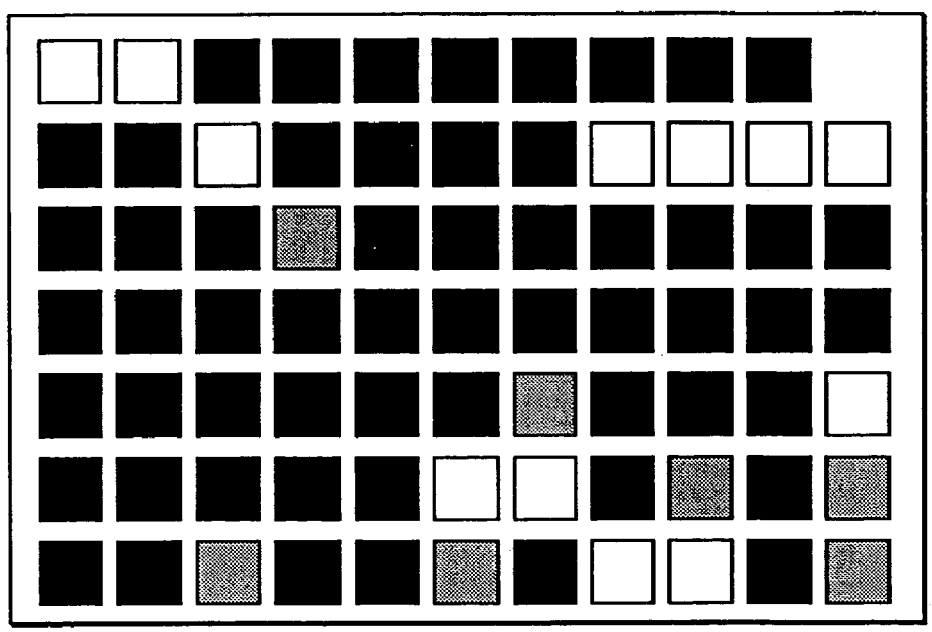
FIG. 7 is a view of a test chart consisting of 77 color patches, employed for determining the illuminating light characteristic matrix.

The lighting characteristic matrixes $CR_{hr}$, $CR_{hl}$ can be obtained by determining the three stimulation values under the above-mentioned illuminating lights and those under the standard light source, for example with a test chart containing 77 color patches as shown in FIG. 7 and executing optimization for example by the attenuated minimum square method.

The lighting characteristic coefficient $IH_{ks}$ indicates information on the mixing ratio of the high color-rendering light source and the low color-rendering light source as explained in the foregoing, and is set by the lighting characteristic coefficient instructing unit 64 according to the kind of the designated illuminating light.

A plurality of the lighting characteristic coefficients $IH_{ks}$ are prestored in the lighting characteristic coefficient instructing unit 64 corresponding to the kinds of the illuminating lights.

Figure 14:
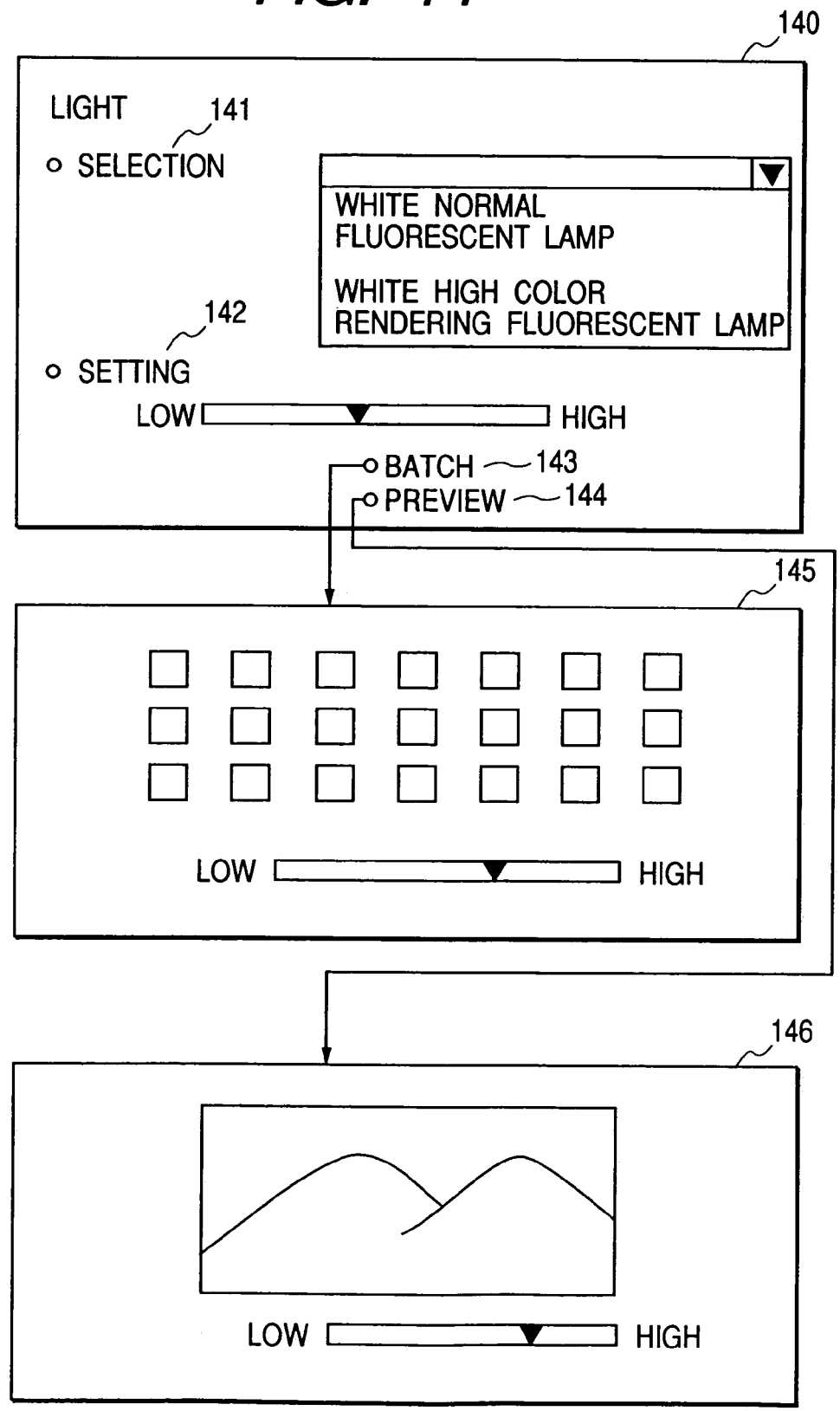
FIG. 14 is a view showing an example of the user interface for designating the illuminating light.

FIG. 14 shows an example of the user interface (UI) relating to the setting of the lighting characteristic coefficient. The setting of the present embodiment includes, as shown in the user interface 140, a selection mode 141 and a setting mode 142.

The selection mode 141 displays the kinds of the illuminating lights stored in the lighting characteristic coefficient instructing unit 64 in the form of a pull-down menu, for selection by the user.

The setting mode 142 sets the value of the lighting characteristic coefficient according to the instruction of the user. According to the position of a black triangle mark on a bar, selected by the manual instruction of the user, the lighting characteristic coefficient instructing unit 64 calculates and sets the value of the lighting characteristic coefficient. The black triangle mark positioned at the left-hand end of the bar sets 0 as $IH_{ks}$ and at the right-hand end sets 1. Also for setting the lighting characteristic coefficient while confirming the effect of the actually set lighting characteristic coefficient, there are provided a mode 143 for displaying the color patches in a user interface 145 and a mode 144 for displaying the original image in a user interface 146.

In case the patch 143 is selected by the user in the UI 140, the patch data representing the predetermined colors are processed according to the lighting characteristic coefficient set on the bar of the UI 140 and the obtained X'Y'Z' data are corrected according to the monitor profile and displayed on the monitor, whereby the user can confirm the effect of the set lighting characteristic coefficient.

Also in case the preview mode 144 is selected by the user in the UI 140, the original image read according to the instruction of the user is processed according to the lighting characteristic coefficient set on the bar and displayed as shown in the UI 146, whereby the user can confirm the effect.

The above-described embodiment allows to easily estimate and correct the colorimetric values under arbitrary light source with a limited memory capacity.

Embodiment 2

The foregoing embodiment 1 does not execute the correction of the color temperature. The present embodiment provides the process including the correction of the color temperature in the process of the embodiment 1.

Figure 8:
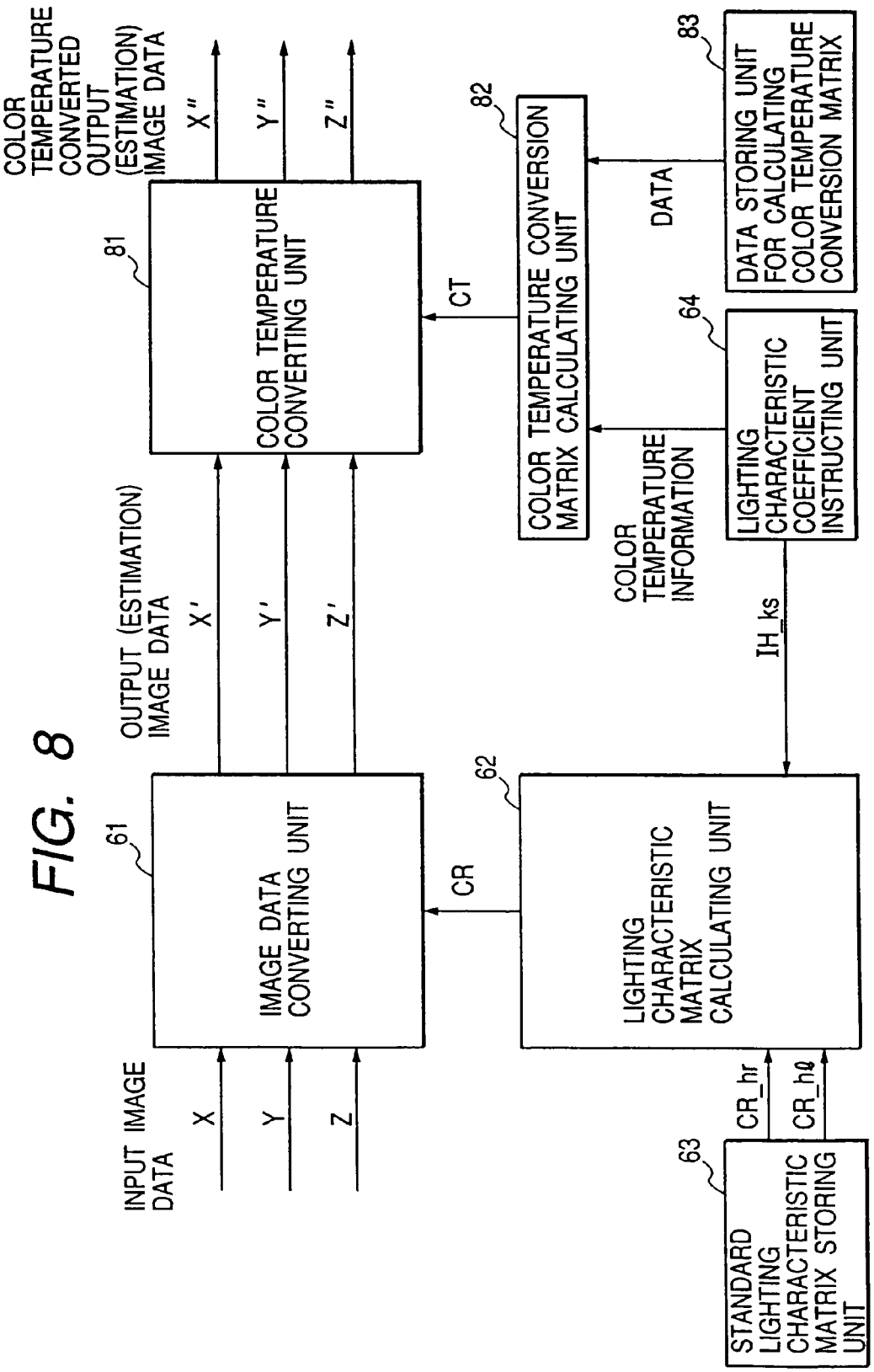
FIGS. 8, 9, 10 and 11 are views showing examples of the colorimetric value estimating system.

As shown in FIG. 8, a color temperature conversion unit 81 is added to the colorimetric value estimation process shown in FIG. 6, whereby the conversion of the color temperature can be easily achieved. The color temperature conversion unit 81 converts the estimated output image data X'Y'Z' into image data X"Y"Z" under the illuminating light of a desired color temperature according to the following equation:

$$\begin{bmatrix} X'' \\ Y'' \\ Z'' \end{bmatrix} = CT \begin{bmatrix} X' \\ Y' \\ Z' \end{bmatrix} \quad\quad H$$

for example by the method of Von. Kries utilizing a color temperature conversion matrix CT calculated by a color temperature conversion matrix calculating unit 82 using data stored in a data storage unit for calculating color temperature conversion matrix 83 and corresponding to the information (for example, XYZ stimulation values) relating to the arbitrary color temperature and given from the lighting characteristic coefficient instructing unit 64.

Instead of the method of Von. Kries, there may be applied another method of color temperature conversion. The method of preparation of the color temperature conversion matrix is detailedly explained for example in "Color Engineering; published by Publishing Office of Tokyo Denki University; Chapter 6 Development of CIE color representation system".

Figure 9:
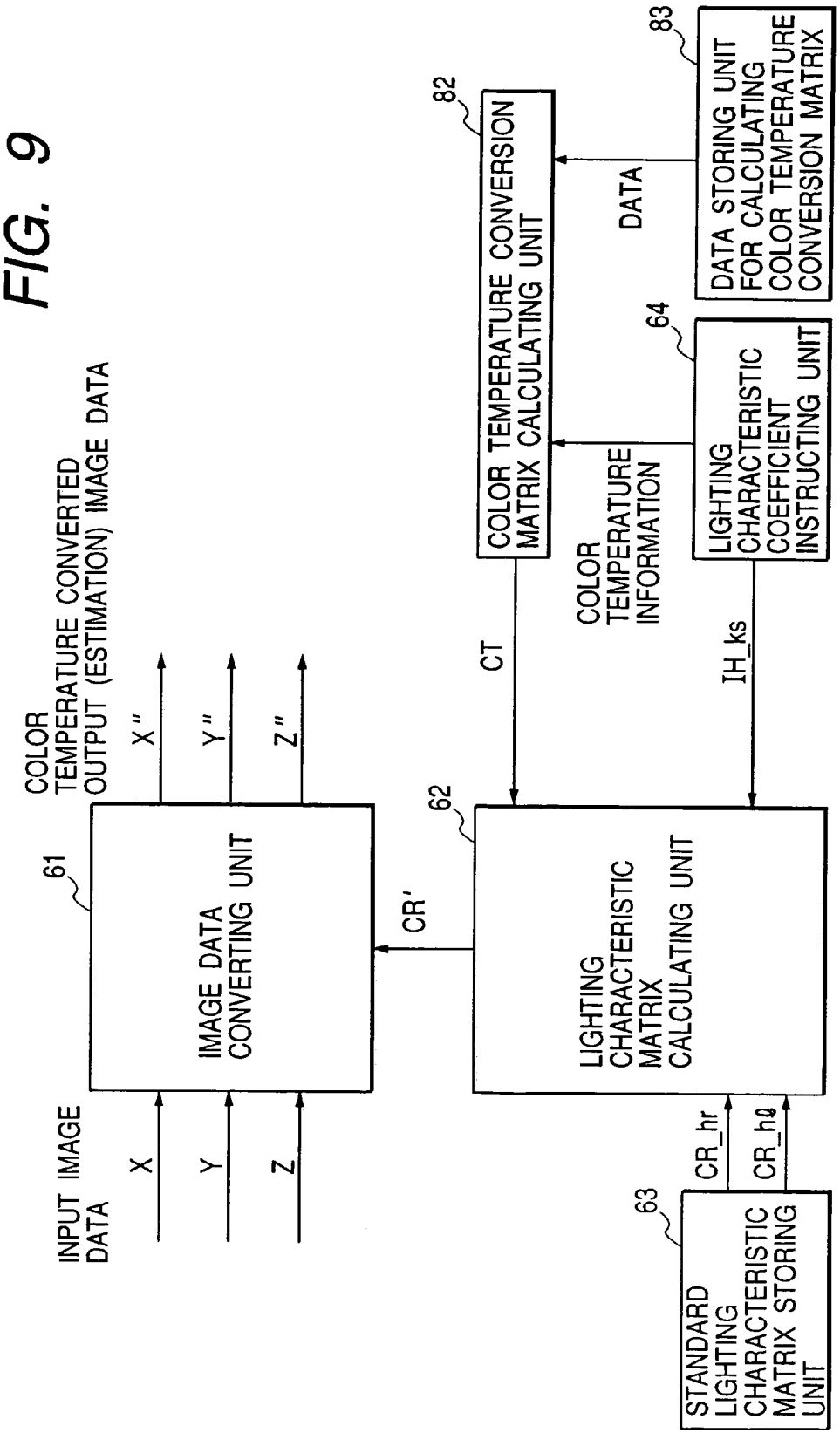

In the process shown in FIG. 8, the image data conversion unit 61 and the color temperature conversion unit 81 are separately provided, but the process may be collectively executed in the image data conversion unit 61 as shown in FIG. 9.

The colorimetric values under desired illumination can be easily estimated and corrected, including the conversion of color temperature, by synthesizing the color temperature conversion matrix CT, calculated in the color temperature conversion matrix calculating unit 82, with the lighting characteristic matrix CR, calculated in the lighting characteristic matrix calculation unit 62, as indicated by the following formula to obtain a lighting characteristic matrix CR' including the color temperature conversion:

$$CR'=CT \cdot CR \quad\quad I$$

and converting the image data by such matrix CR'.

Figure 10:
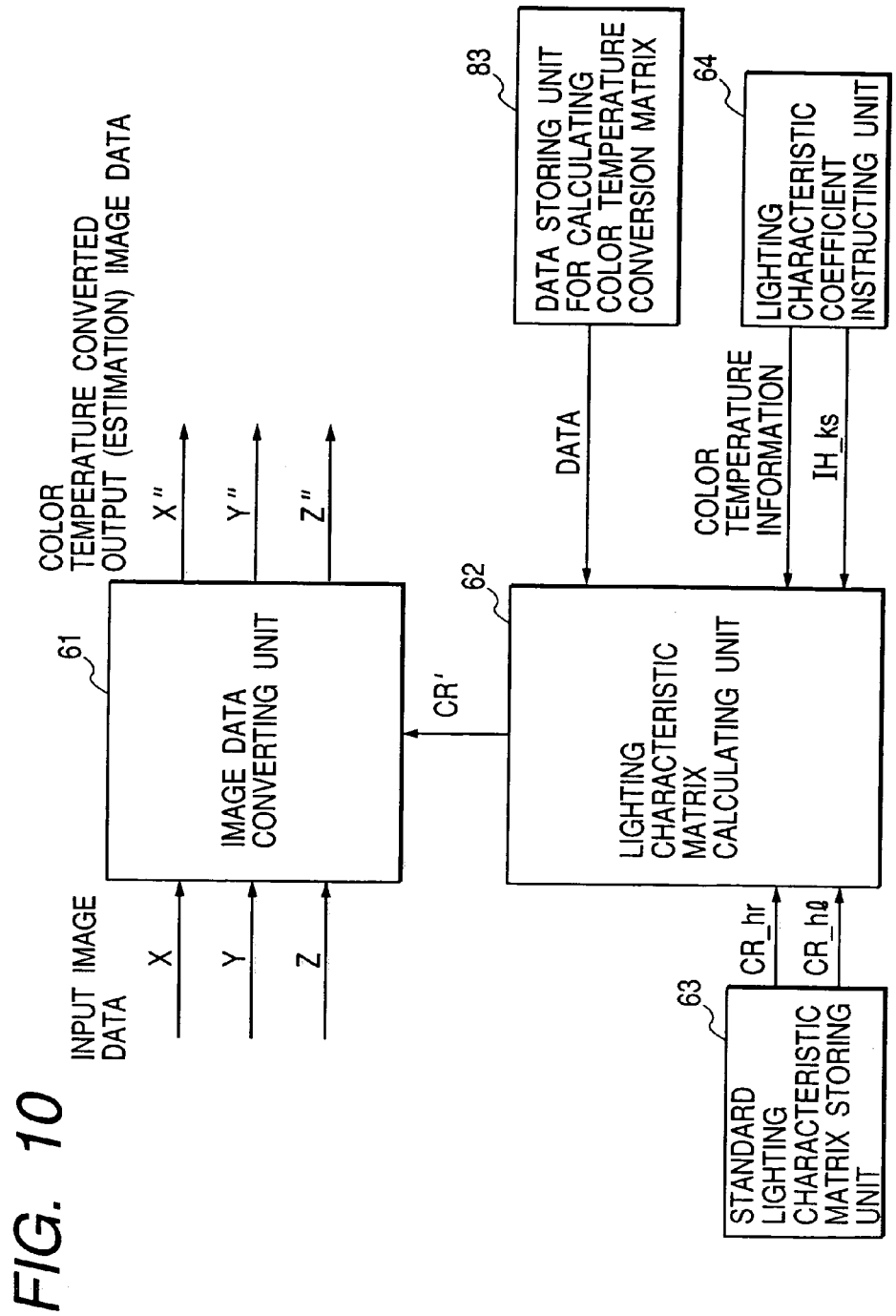

It is also possible, as shown in FIG. 10, to calculate the color temperature conversion matrix CT in the lighting characteristic matrix calculation unit 62 and to execute the matrix calculation based on the obtained result.

Figure 11:
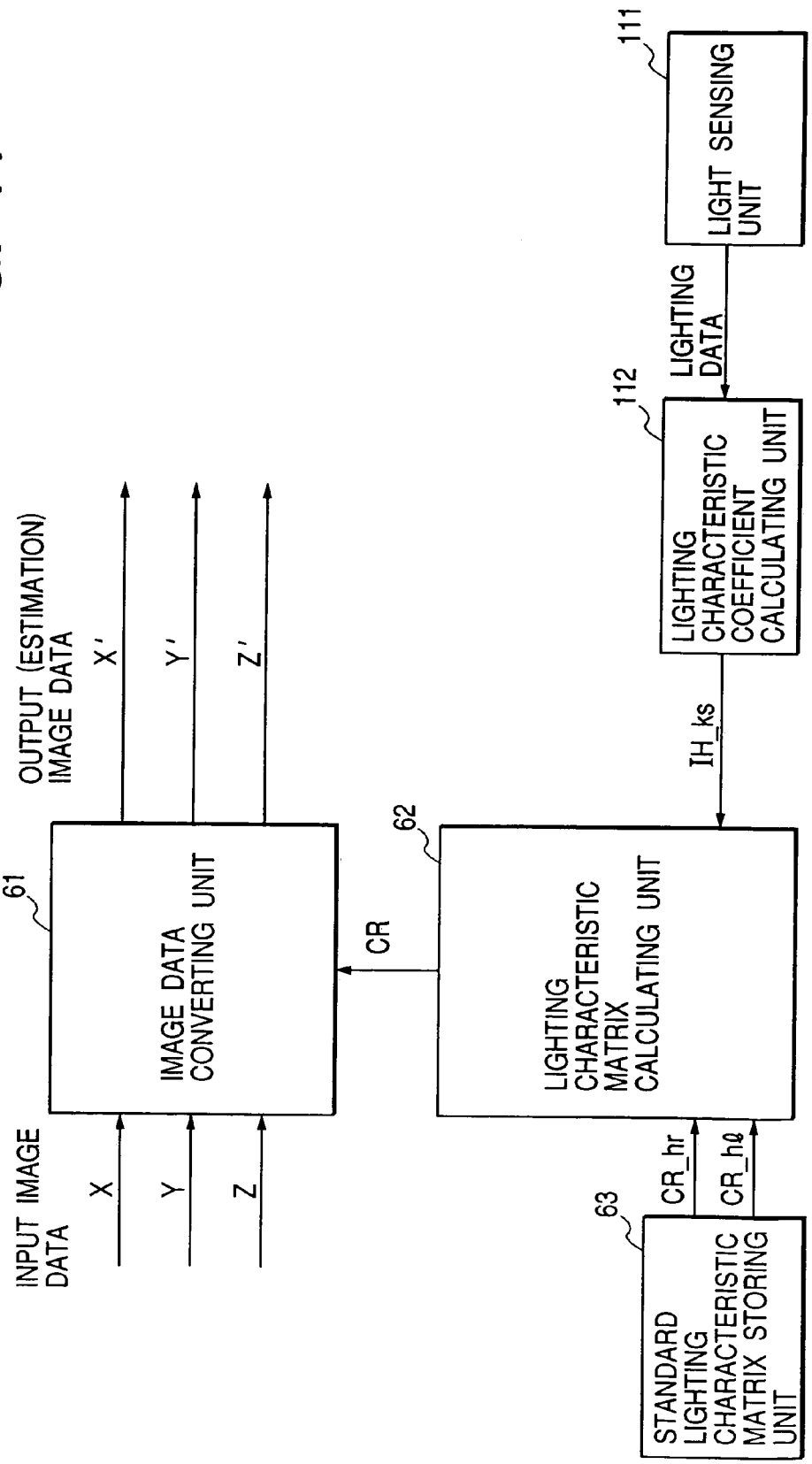

It is also possible to automatically set the lighting characteristic coefficient or the color temperature information without the instruction of the user through the user interface as shown in FIG. 14, by providing, as shown in FIG. 11, a light sensing unit 111 and a lighting characteristic coefficient calculation unit 112.

Figure 12:
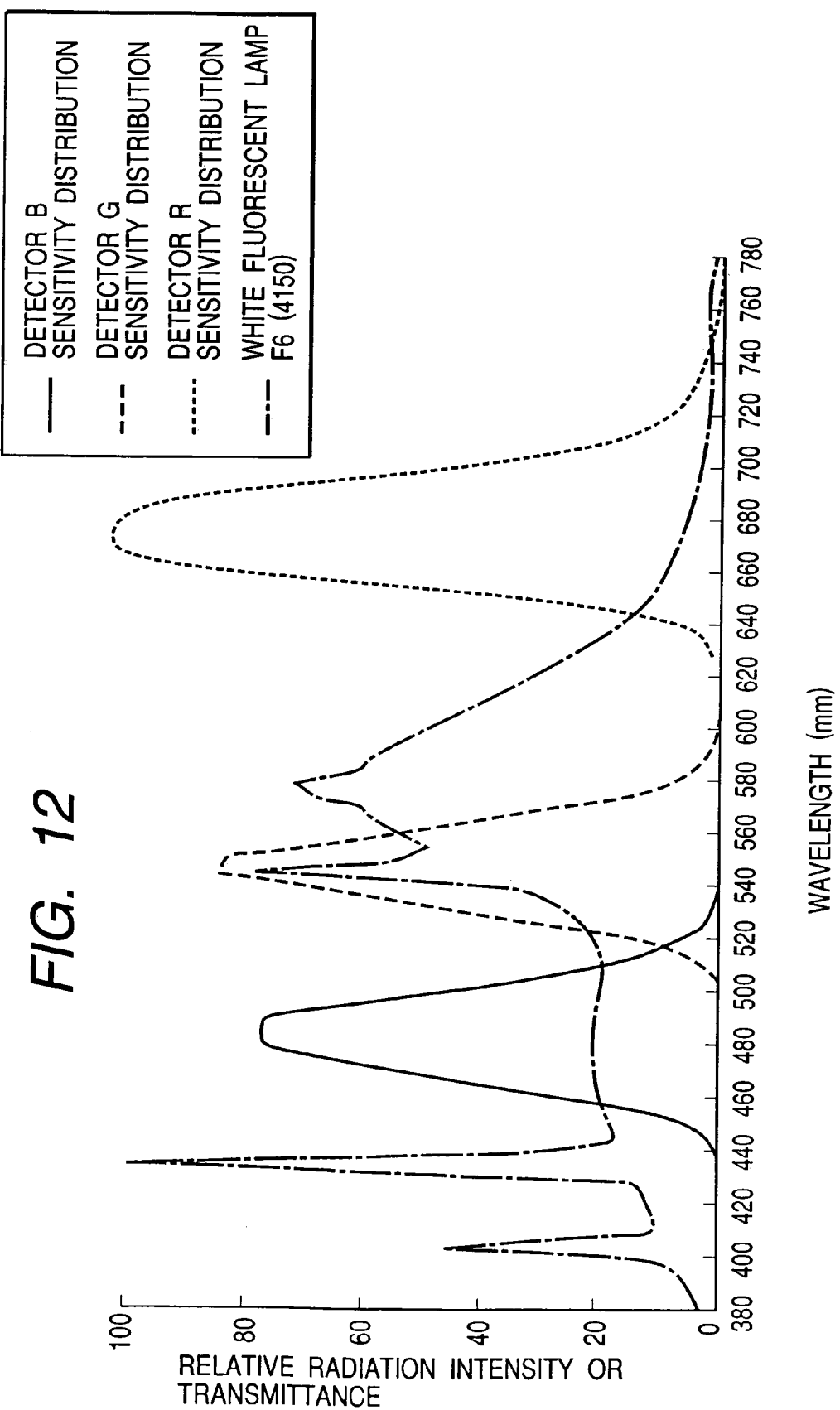
FIG. 12 is a chart showing the spectral sensitivity of a sensor in the illuminating light sensing unit.

The light sensing unit 111 is provided with a sensor of sensitivity characteristics for example as shown in FIG. 12 for measuring the illuminating light, and the BGR output signals of the sensor are processed to obtain individually the above-mentioned set values (color temperature, lighting characteristic coefficient).

Embodiment 3

Though in the foregoing embodiments 1 and 2, the lighting characteristic matrix is employed for estimating and correcting the difference in color resulting from the difference in the spectral distribution of the illuminating lights, the present invention is not limited to a method utilizing such matrix and can also be attained for example with a three-dimensional look-up table.

In this case, for estimating and correcting the difference in color resulting from the difference in the spectral distribution of the illuminating lights, there is employed a lighting characteristic three-dimensional look-up table CR3LUT, which is defined by the following equation:

$$CR3LUT=IH_{ks} \cdot CR3LUT_{hr}+(1-IH_{ks}) \cdot CR3LUT_{hl} \quad\quad J$$

wherein $CR3LUT_{hr}$ is a lighting characteristic three-dimensional look-up table corresponding to the natural daylight, the incandescent lamp or the illuminating light, obtained from a standard light source defined in the Japan Industrial Standards or a light source of satisfactory color rendering such as a high color-rendering fluorescent lamp.

$CR3LUT_{hl}$ is a lighting characteristic three-dimensional look-up table corresponding to the illuminating light obtained from a light source of low color rendering, as defined in the Japan Industrial Standards, such as an ordinary fluorescent lamp.

Also $IH_{ks}$ is a lighting characteristic coefficient, equivalent to that in the foregoing embodiments.

Figure 13:
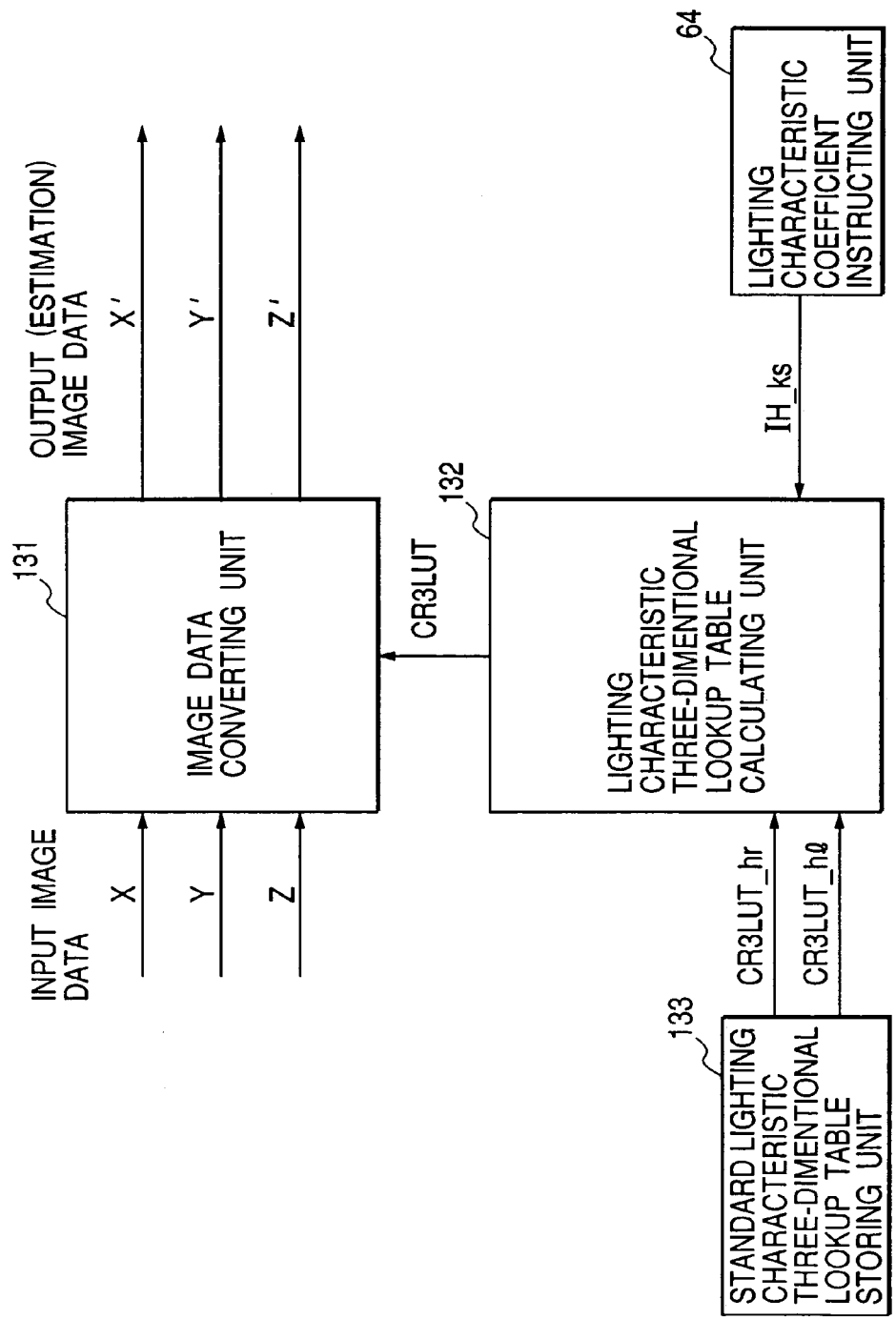
FIG. 13 is a view showing an example of the calorimetric value estimating system.

FIG. 13 shows an example of the calorimetric value estimating system utilizing such calorimetric value estimating method, wherein an image data conversion unit 131 converts the input image data XYZ into estimated image data X'Y'Z' under a designated light source according to the following equation:

$$(X',Y',Z')=CR3LUT(X,Y,Z) \qquad K$$

utilizing the lighting characteristic three-dimensional look-up table CR3LUT calculated in the lighting characteristic three-dimensional look-up table calculation unit 132.

It is also possible to estimate and correct the difference in color resulting from the difference in the spectral distribution of the illuminating lights, employing a function as more general means, and, in such case, the arbitrary illuminating light characteristics are defined by a function (for example CRF). The function CRF satisfies the following relationship:

$$CRF=CRF(CRF_{hr}, CRF_{hl}, IH_{ks}) \qquad L$$

which may assume a specific form as in the foregoing embodiments:

$$CRF=IH_{ks} \cdot CRF_{hr}+(1-IH_{ks}) \cdot CRF_{hl} \qquad M$$

or $$CRF=IH_{ks}^2 \cdot CRF_{hr}+(1-IH_{ks})^2 \cdot CRF_{hl} \qquad N$$

or $$CRF=IH_{ks}^2 \cdot CRF_{hr}+(1-IH_{ks}^2) \cdot CRF_{hl} \qquad O$$

wherein $CRF_{hr}$ is a lighting characteristic function corresponding to the natural daylight, the incandescent lamp or the illuminating light, obtained from a standard light source defined in JIS or a light source of satisfactory color rendering such as a high color-rendering fluorescent lamp; and $CRF_{hl}$ is a lighting characteristic function corresponding to the illuminating light obtained from a light source of low color rendering, as defined in JIS, such as an ordinary fluorescent lamp.

Based on the above-described function, the calorimetric values XYZ are converted into the values X'Y'Z' as indicated by the following equation:

$$(X',Y',Z')=CRF(X,Y,Z) \qquad P$$

wherein $IH_{ks}$ is the lighting characteristic coefficient equivalent to that in the foregoing embodiments.

Embodiment 4

Figure 15:
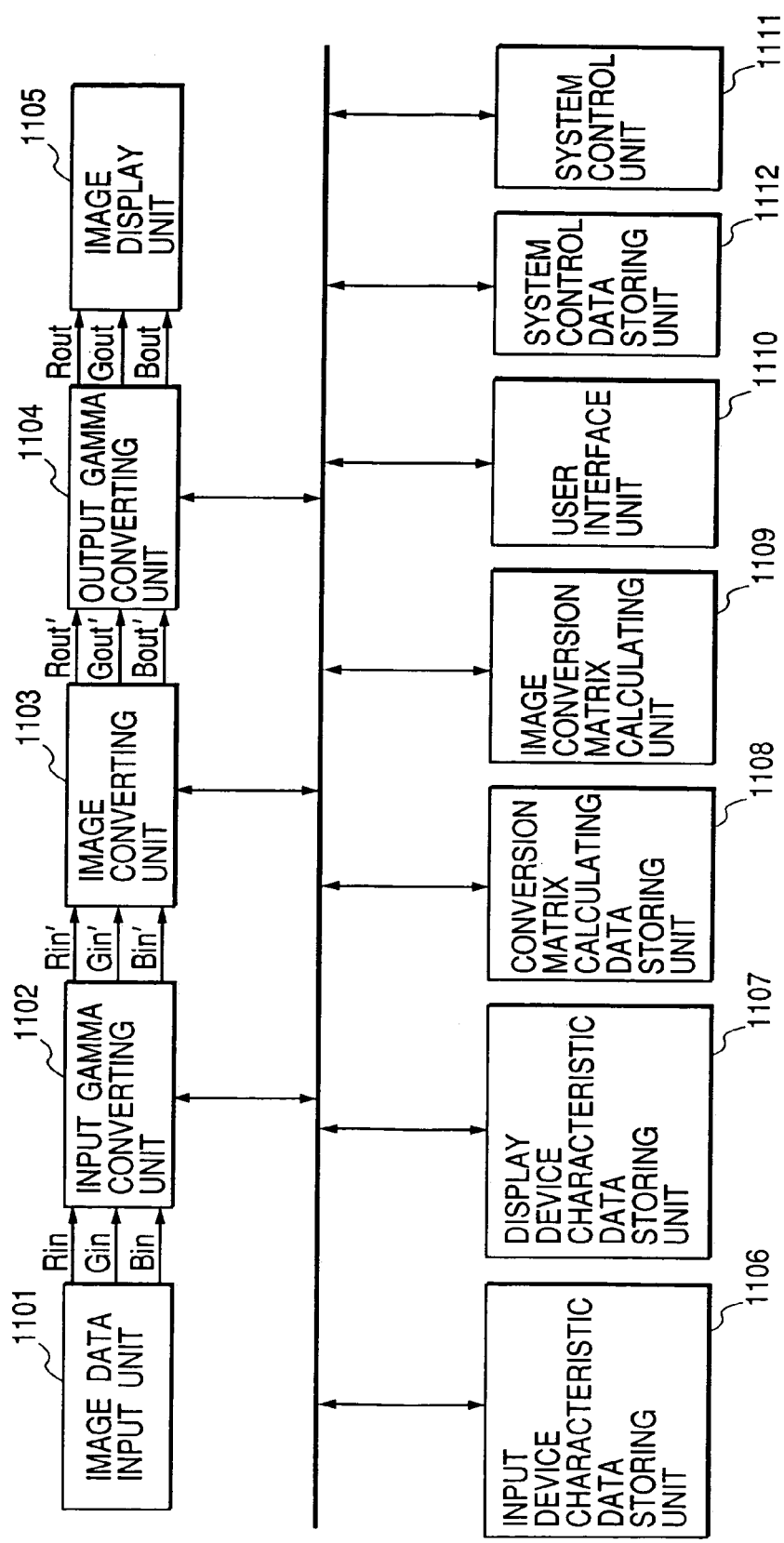
FIG. 15 is a block diagram showing a color image display system of an embodiment 4.

FIG. 15 shows an example of the color image display system constituting an embodiment 4 of the present invention.

The upper half in FIG. 15 principally shows the flow of the image data and the signal processing, while the lower half is composed of data storing units and data calculating units for the signal processing.

An image data input unit 1101 is connected with a scanner, a digital camera or an image memory device and receives the image of an object, a printed matter etc. in the form of color image signals $R_{in}G_{in}B_{in}$.

The image signals $R_{in}G_{in}B_{in}$ entered by the image data input unit 1101 are subjected, in an input gamma conversion unit 1102, to the correction of the gamma characteristics of the input device providing these image signals, utilizing a look-up table, and are converted into in-system input signals $R_{in}'G_{in}'B_{in}'$ as indicated by the following equations:

$$R_{in}'=LUT_{Rin}(R_{in})$$

$$G_{in}'=LUT_{Gin}(G_{in})$$

$$B_{in}'=LUT_{Bin}(B_{in}) \qquad Q$$

The above-mentioned gamma conversion LUT is stored in an input device characteristic data storing unit 1106, and is set in the input gamma conversion unit 1102 by a system control unit 1111 according to the information from a user interface unit 1110.

The in-system input signals $R_{in}'G_{in}'B_{in}'$ are subjected to matrix conversion represented by the following equation in an image conversion unit 1103, thereby being converted into in-system output signals $R_{out}'G_{out}'B_{out}'$:

$$\begin{bmatrix} R'_{out} \\ G'_{out} \\ B'_{out} \end{bmatrix} = MTX_{gh} \begin{bmatrix} R'_{in} \\ G'_{in} \\ B'_{in} \end{bmatrix} \qquad R$$

Figure 16:
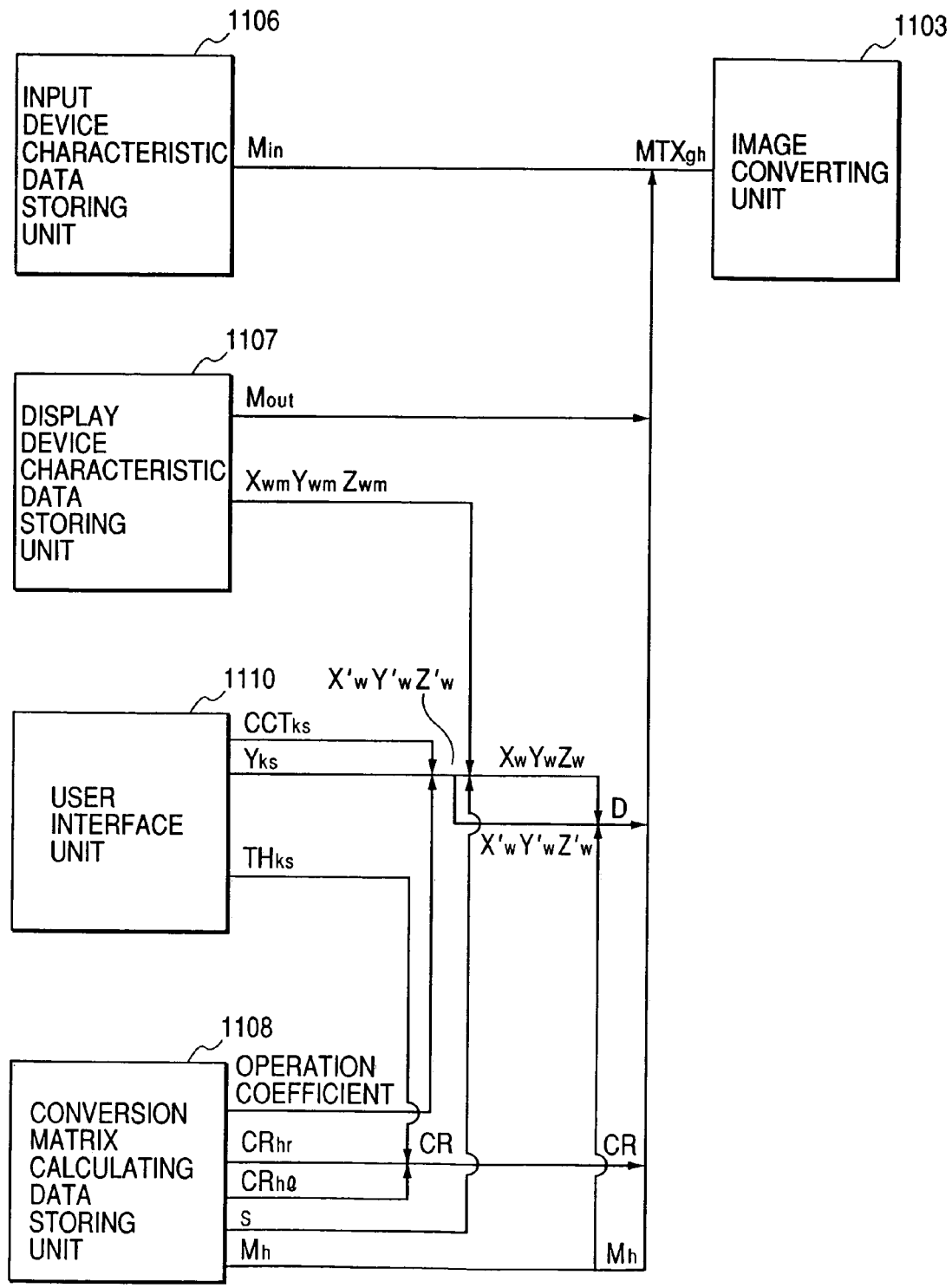
FIG. 16 is a view showing the flow of data and results of calculations in the calculation of a matrix $MTX_{gh}$.

A conversion matrix $MTX_{gh}$ is determined in an image conversion matrix calculating unit 1109 according to the instruction from the system control unit 1111 as will be explained later, utilizing the characteristics of the image input device, image display device and observing ambient light obtained from the user interface unit 1110, the input device characteristic data storing unit 1106, the display device characteristic data storing unit 1107 and the conversion matrix calculation data storing unit 1108, and is set in the image conversion unit 1103. FIG. 16 shows the flow of various data and the results of calculations in the above-described operations.

The in-system output signals $R_{out}'G_{out}'B_{out}'$ are subjected, in an output gamma conversion unit 1104, to a correction according to the gamma characteristics of the display device on which these signals are to be displayed, thus being converted into output image signals $R_{out}'G_{out}'B_{out}'$. This conversion is achieved by a look-up table conversion utilizing the signals $R_{out}'G_{out}'B_{out}'$ as represented by the following equation:

$$R_{out}=LUT_{Rout}(R_{out}')$$

$$G_{out}=LUT_{Gout}(G_{out}')$$

$$B_{out}=LUT_{Bout}(B_{out}') \qquad S$$

The above-mentioned gamma conversion LUT is stored in the display device characteristic data storing unit 1107, and is set in the output gamma conversion unit 1104 by the system control unit 1111 according to the information from the user interface unit 1110.

The image display unit 1105 is composed of a monitor such as a cathode ray tube or a liquid crystal display device and displays an image according to the output image signals $R_{out}G_{out}B_{out}$.

In the following there will be explained the function of the system control unit 1111.

The system control unit 1111 controls the functions of the present system.

Figure 17:
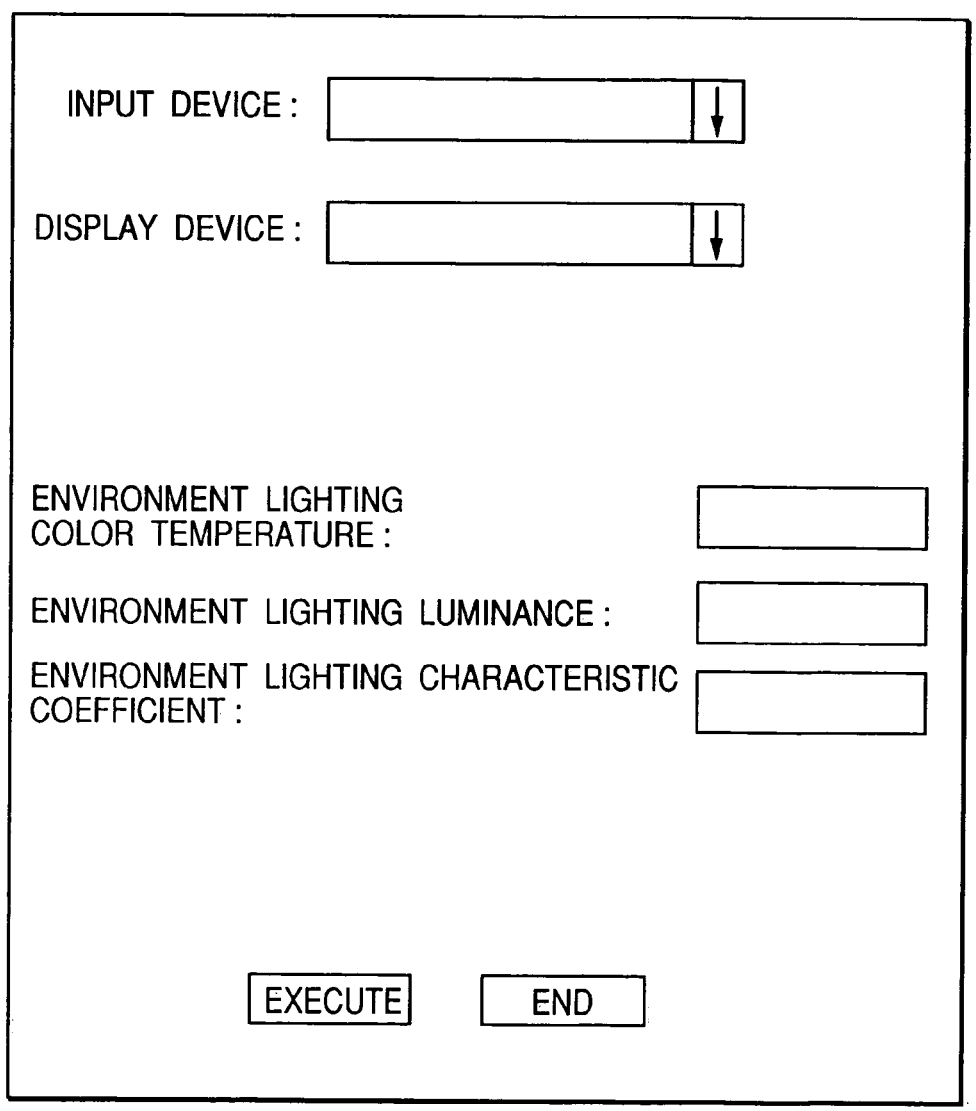
FIG. 17 is a view showing a user interface image frame.

Also the system control unit 1111 selects, through the user interface shown in FIG. 17, a gamma conversion look-up table matching the input device and a gamma conversion look-up table matching the output device respectively from the input device characteristic data storing unit 1106 and the display device characteristic data storing unit 1107, and sets these tables respectively in the input gamma conversion unit 1102 and the output gamma conversion unit 1104.

Also as shown in FIG. 16, the system control unit 1111 sends, through the user interface shown in FIG. 17, following data to the image conversion matrix calculation unit 1109, referring to the input device characteristic data storing unit 1106, the display device characteristic data storing unit 1107 and the conversion matrix calculation data storing unit 1108. The above-mentioned data contain an ambient lighting color temperature $CCT_{ks}$, an ambient light luminosity $IH_{ks}$ a conversion matrix $M_{in}$ corresponding to the input device (for converting the in-system input signals $R_{in}'G_{in}'B_{in}'$ into the in-system conversion signals XYZ), a conversion matrix $M_{out}$ corresponding to the display device (for converting the in-system conversion signals XYZ into the in-system output signals $R_{out}'G_{out}'B_{out}'$) three stimulation values $X_{WIII}Y_{WII}iZ_{WIII}$ of the displayed white color of the display device, an ambient light characteristic correcting matrix $CR_{hr}$ corresponding to the light source of high color rendering, an ambient light characteristic correcting matrix $CR_{hl}$ corresponding to the light source of low color rendering, an adaptation ratio s, a matrix $M_h$ for converting the three stimulation values XYZ of the CIEXYZ into visual RGB values, and a calculation coefficient.

The system control unit causes the image conversion matrix calculation unit 1109 to calculate the image conversion matrix $MTX_{gh}$ and sets the obtained image conversion matrix $MTX_{gh}$ in the image conversion unit 1103.

The system control data storing unit 1112 stores a flow chart relating to the operations of the system control unit 1111 and a user interface image, according to which the present system functions.

The conversion matrix calculation data storing unit 1108 stores calculation coefficients and a lighting characteristic correcting matrix required for calculating the image conversion matrix.

The image conversion matrix calculating unit 1109 calculates the image conversion matrix $MTX_{gh}$ according to the instruction of the system control unit 1111 and based on the above-mentioned data.

FIG. 16 shows the flow of various data and of results of calculations in the calculation of the image conversion matrix $MTX_{gh}$.

The image conversion matrix $MTX_{gh}$ is obtained as the product of plural matrixes as indicated by the following equation:

$$MTX_{gh} = M_{out} \cdot M_h^{-1} \cdot D \cdot M_h \cdot CR \cdot M_{in} \qquad \text{T}$$

wherein $M_{out}$ is a matrix for converting, for the display device, the in-system conversion signals XYZ into the in-system output signals $R_{out}'G_{out}'B_{out}'$, whereby the in-system conversion signals XYZ not dependent on the characteristics of the display device are converted into the in-system output signals $R_{out}'G_{out}'B_{out}'$ dependent on (matching) the characteristics of the display device.

$M_{in}$ is a matrix for converting, for the input device, the in-system input signals $R_{in}'G_{in}'B_{in}'$ into the in-system conversion signals XYZ, whereby the in-system input signals $R_{in}'G_{in}'B_{in}'$ dependent on the characteristics of the display device are converted into the in-system conversion signals XYZ not dependent on the characteristics of the device and the signal conversion in the system can be rendered independent of the individual input, output and display devices.

$M_h$ is a matrix for converting the three stimulation values XYZ of the CIEXYZ color representation system employed as the in-system conversion signal system in the present invention into responses $R_h G_h B_h$ (visual RGB values) at the level of receptor of the human eyes (see Foundation of Color Engineering: Asakura Shobo; p.216), whereby the image signals can be matched with the human characteristics and there can be achieved signal processing simulating various processes executed by the human at the image observation.

CR is a matrix for converting the three stimulation values $X_{D65}Y_{D65}Z_{D65}$ under the illumination with the standard light source (D65) into three stimulation values $X_{ks}Y_{ks}Z_{ks}$ under the ambient lighting. For converting three stimulation values under certain illuminating light into those under another illuminating light, there is known, for example, a conversion method corresponding to the change in the color temperature, such as the color adaptation conversion (such as the method of Von. Kries). However, as often felt in the image observation under the natural daylight and under the daylight type fluorescent lamp, certain colors may be felt differently even if the color temperature is same. Also certain colors may be felt different even if the isochromaticity is attained by the color adaptation conversion for the colors to the achromatic color. Such phenomena are assumed to result from the spectral distribution characteristics of the illuminating light, and the evaluating method therefor is already known, for example the method of evaluating the color rendering of the light source according to JIS-Z-8726 (1990). The matrix CR employed in the present embodiment is to correct the difference in the apparent colors resulting from the difference in the spectral distribution of the illuminating light mentioned above. In this manner it is rendered possible to correct the difference in the spectral characteristics of the ambient illuminating light and to attain better isochromatic feeling.

The ambient lighting characteristic correcting matrix CR is desirably determined for each ambient illuminating light corresponding to the actual ambient situation. For example, this matrix can be obtained by determining the three stimulation values under the above-mentioned illuminating lights and those under the standard light source, for example with a test chart containing 77 color patches as shown in FIG. 7 and executing optimization for example by the attenuated minimum square method. The above-described method can be easily executed in case the number of the required illuminating lights is limited to several kinds. In practice, however, the condition of lighting changes in various manner according to the kind of the illuminating light source, the time-dependent change thereof, and the change in the state of the incoming external light such as the solar light, and it is difficult, in the above-described method, to determine the ambient lighting characteristic correcting matrix corresponding to the ambient illuminating light varying in various manners.

On the other hand, in the present embodiment, the ambient lighting characteristic correcting matrix CR is determined by the following equation:

$$CR = IH_{ks} \cdot CR_{hr} + (1 - IH_{ks}) \cdot CR_{hl} \quad \quad U$$

In the above-mentioned equation, $CR_{hr}$ is an ambient lighting characteristic correcting matrix corresponding to the ambient illuminating light obtained from the natural daylight, an incandescent lamp or a standard light source defined in the Japan Industrial Standards or a light source of satisfactory color rendering such as a high color-rendering fluorescent lamp. $CR_{hr}$ employed in the present embodiment is determined by an isochromatic feeling experiment conducted with the algorithm of the present invention under respectively light source, utilizing the ambient lighting characteristic correcting matrixes obtained for the above-mentioned light sources. In the above-mentioned experiment, the corrections with the ambient lighting characteristic correcting matrixes corresponding to the above-mentioned light sources provided satisfactory results in any of the above-mentioned light sources. Consequently the light sources corresponding to the above-described class can be collectively dealt with, and a single correcting matrix can be commonly adopted for this class.

$CR_{hl}$ is an ambient lighting characteristic correcting matrix corresponding to the illuminating light obtained from a light source of low color rendering, as defined in the Japanese Industrial Standards, such as an ordinary fluorescent lamp. $CR_{hl}$ employed in the present embodiment is determined by an isochromatic feeling experiment conducted with the algorithm of the present invention under respectively light source, utilizing the ambient lighting characteristic correcting matrixes obtained for the above-mentioned light sources. Also in this case, the corrections with the ambient lighting characteristic correcting matrixes corresponding to the above-mentioned light sources provided satisfactory results in any of the above-mentioned light sources. Consequently the light sources corresponding to the above-described class can be collectively dealt with, and a single correcting matrix can be commonly adopted for this class.

Also $IH_{ks}$ is an ambient lighting characteristic coefficient entered by the user through the user interface unit 1110, and assumes a value between 0 and 1.

In case $IH_{ks}=0$, CR coincides with $CR_{hr}$. The matrix in this case corresponds to the illuminating light of satisfactory color rendering, such as the natural daylight, the incandescent lamp, the JIS defined standard light source of the JIS defined high color rendering fluorescent lamp.

In case $IH_{ks}=1$, CR coincides with $CR_{hl}$. In this case, the matrix corresponds to the illuminating light of low color rendering, such as the JIS defined ordinary fluorescent lamp.

In case $0<IH_{ks}<1$, CR becomes a mixture of $CR_{hr}$ and $CR_{hl}$ with a mixing ratio $IH_{ks}$, and corresponds to an ambient illuminating light obtained by mixing the light source of high color rendering and the light source of low color rendering with an arbitrary mixing ratio $IH_{ks}$ The ordinary ambient illuminating light most frequently encountered is in this state.

The above-explained experiment indicate that the light sources of high color rendering and those of low color rendering can be respectively grouped, and the ordinary state can be considered as a mixed state of these two groups. Assuming such state, an isochromatic feeling experiment was conducted with the above-mentioned algorithm and under various light source, employing the ambient lighting characteristic correcting matrix CR for each light source.

Also in this case, the correction under such light sources with the ambient lighting characteristic correcting matrix corresponding to each of such light source provided satisfactory result.

In this manner, the above-described algorithm allows to obtain the ambient lighting characteristic correcting matrix corresponding to various ambient illuminating lights, utilizing the ambient lighting characteristic correcting coefficient $IH_{ks}$.

Finally, D is a color adaptation conversion diagonal matrix for effecting color adaptation conversion from a state adapted to an observing environment for observing an object, a printed matter etc. to a state adapted for observing an image on the display device, and is defined by:

$$D = \begin{bmatrix} \frac{R_{hw}}{R'_{hw}} & 0 & 0 \\ 0 & \frac{G_{hw}}{G'_{hw}} & 0 \\ 0 & 0 & \frac{B_{hw}}{B'_{hw}} \end{bmatrix} \quad \quad V$$

wherein $(R'_{hw}, G'_{hw}, B'_{hw})$ are the visual RGB values of white color under the observing environment, while $(R_{hw}, G_{hw}, B_{hw})$ are the visual RGB values of standard white color in the observation of the display device. These visual RGB values can be obtained from the three stimulation values XYZ, utilizing the aforementioned matrix $M_h$ in the following manner:

$$\begin{bmatrix} R'_{hw} \\ G'_{hw} \\ B'_{hw} \end{bmatrix} = M_h \begin{bmatrix} X'_w \\ Y'_w \\ Z'_w \end{bmatrix} \quad \quad W$$

$$\begin{bmatrix} R_{hw} \\ G_{hw} \\ B_{hw} \end{bmatrix} = M_h \begin{bmatrix} X_w \\ Y_w \\ Z_w \end{bmatrix}$$

wherein $X'_w Y'_w Z'_w$ are the three stimulation values of the ambient illuminating light, which can be obtained through the user interface unit and determined in the following manner, utilizing the ambient lighting color temperature $CCT_{ks}$ and the ambient light luminance $Y_{ks}$. At first the colorimetric values $(X'_w, Y'_w)$ are obtained from the ambient lighting color temperature $CCT_{ks}$ according to the following equations:

$$x'_w = \frac{4.6070 \cdot 10^9}{CCT_{ks}^3} + \frac{2.9678 \cdot 10^6}{CCT_{ks}^2} + \frac{0.09911 \cdot 10^3}{CCT_{ks}} - 0.244063 \quad \quad X$$

$$y'_w = -3.000 \cdot x'^2_w + 2.870 \cdot x'_w - 0.275$$

Then the three stimulation values are obtained according to the following equations, utilizing the above-mentioned calorimetric values $(x'_w, Y'_w)$ and the ambient lighting luminance $Y_{ks}$:

$$x'_w = \frac{x'_w}{y'_w} \cdot Y_{ks}$$  Y $$Y'_w = Y_{ks}$$

$$Z'_w = \frac{1 - x'_w - y'_w}{y'_w} \cdot Y_{ks}$$

On the other hand, $X_w Y_w Z_w$ are the three stimulation values of the standard white color in the observation of the display device, and are determined according to the following equations, utilizing the three stimulation values $X'_w Y'_w Z'_w$ of the ambient illuminating light and the three stimulation values $X_{WIII} Y_{WIII} Z_{WIII}$ of the white color on the display device, obtained from the display device characteristic data storing unit 107:

$$X_w = (1-s) \cdot X'_w + s \cdot X_{wm}$$

$$Y_w = (1-s) \cdot Y'_w + s \cdot Y_{wm}$$

$$Z_w = (1-s) \cdot Z'_w + s \cdot Z_{wm}$$  Z

In case of observing an image on the display device, the observer is not considered to adapt to the displayed image only but to both the displayed image and the ambient illuminating light in a certain proportion, and the three stimulation values $X_w Y_w Z_w$ of the standard white color can be determined from the foregoing equations, wherein s is a parameter (adaptation ratio) indicating the proportion of adaptation to the white color on the display, namely the influence of the displayed white color, relative to the observing environmental white on the standard white color. The adaptation ratio s varies according to the color temperature of the observing ambient light environmental light) and the background color of the image (background color of displayed image). For example, if the background color changes in gray scale from black to white, the proportion of adaptation to the ambient light becomes larger as the background color becomes closer to black. In the present embodiment the adaptation ratio s assumes a value within a range from 0.5 to 0.8, corresponding to the above-mentioned conditions.

In the above-explained manner, the image conversion matrix calculating unit 1109 calculates the image conversion matrix $MTX_{gh}$ utilizing the aforementioned data and according to the instruction of the system control unit 1111.

In the following there will be explained the functions of the present embodiment.

In the normal operation mode, the present system functions in the following manner.

Figure 18:
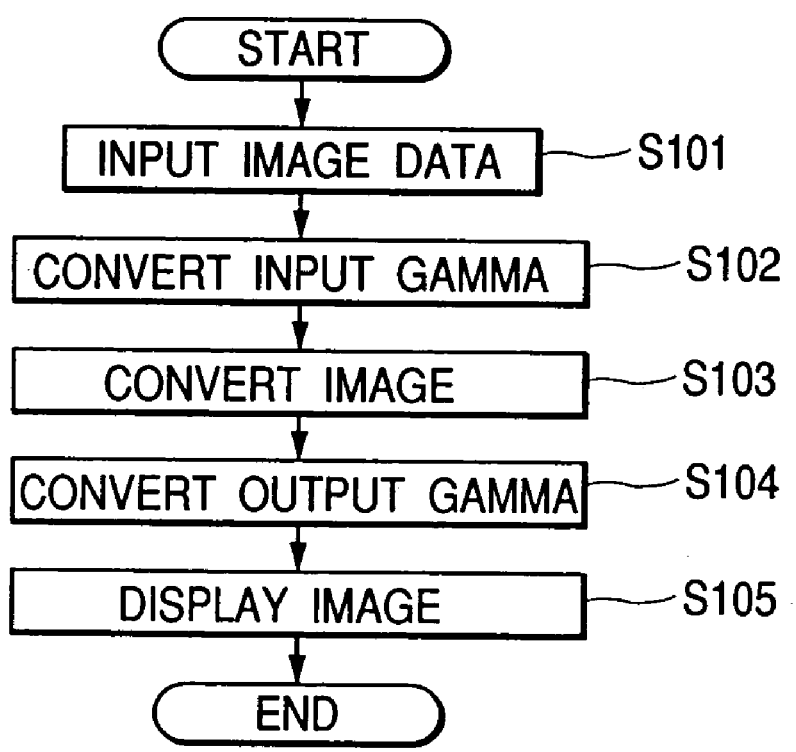
FIG. 18 is a flow chart showing the operations in an ordinary operation mode.

FIG. 18 is a schematic flow chart of the functions of the normal operation mode.

The image data input unit 1101 acquires the input image signals $R_{in} G_{in} B_{in}$ (s101), and the input gamma conversion unit 1102 executes conversion into the in-system input signals $R'_{in} G'_{in} B'_{in}$ as explained in the foregoing, utilizing the input device gamma characteristic correcting look-up table which is set in advance corresponding to the current system (s102). Then the image conversion unit 1103 converts the in-system input signals $R'_{in} G'_{in} B'_{in}$ in into the in-system output signals $R'_{out} G'_{out} B'_{out}$, utilizing the image conversion matrix which is also set in advance (s103), then the output gamma conversion unit 1104 obtains the output image signals $R_{out} G_{out} B_{out}$ as explained in the foregoing, utilizing the display device gamma characteristic correcting look-up table which is also set in advance (s104) and the obtained signals are displayed by the image display unit 1105 (s105).

In case of a change in the input device, the output device or the external environment such as the ambient illuminating light, the present system can renew, in responsive manner through the user interface, the input device gamma characteristic correcting look-up table, the output device gamma characteristic correcting look-up table and the image conversion matrix, which constitute the in-system functions, according to the changed external environment, whereby the system can match the apparent colors in the displayed image regardless of the change in the external environment of the system.

Figure 19:
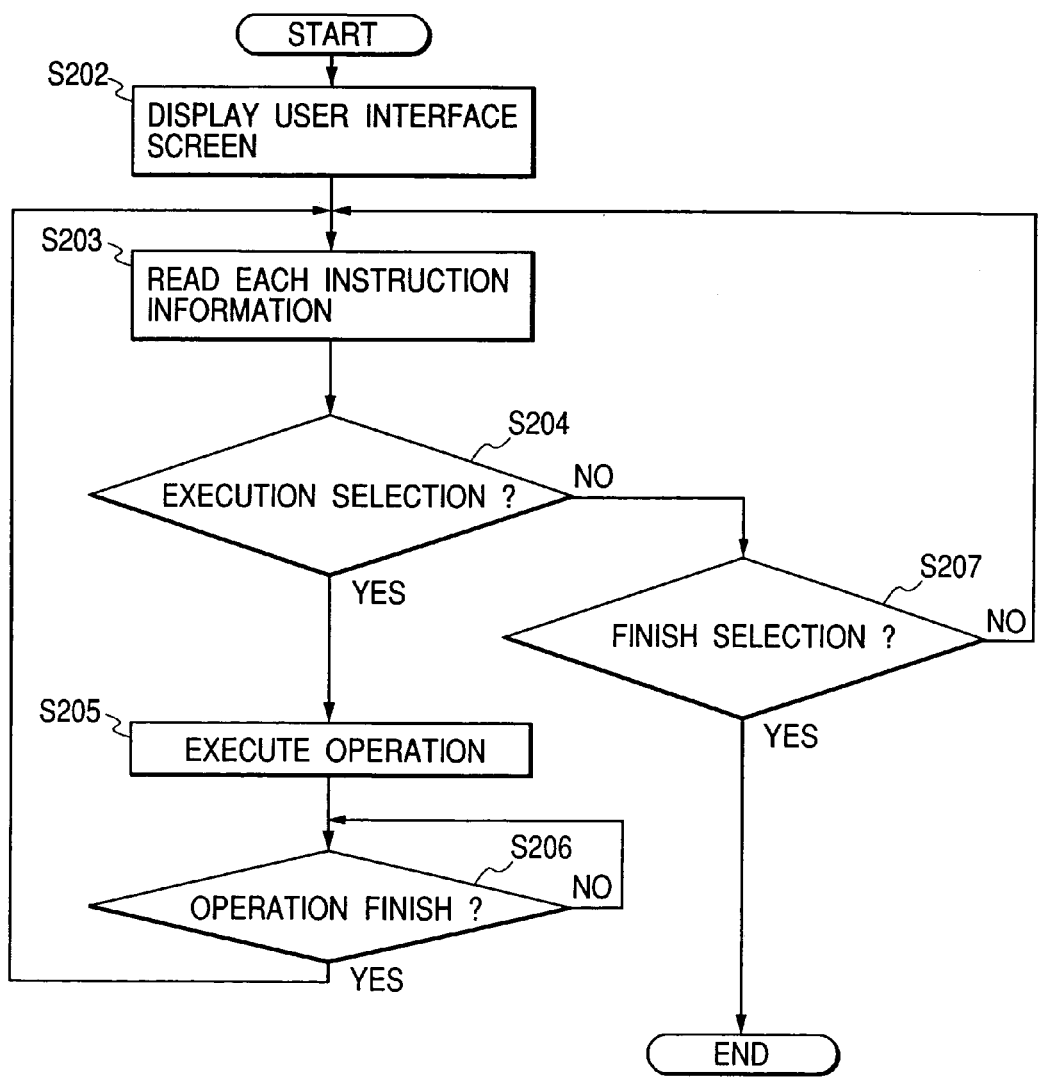
FIG. 19 is a flow chart showing the operations in a user interface mode.

FIG. 19 is a flow chart showing the operations relating to the user interface of the present system.

When the user interface mode is accessed in the present system, a step s202 reads and displays the information of the user interface image shown in FIG. 17. On this user interface image, the user enters the input device in an input device column, the display device in a display device column, the color temperature $CCT_{ks}$ of the ambient illuminating light in an ambient lighting color temperature column, and the ambient lighting characteristic coefficient $IH_{ks}$ in an ambient lighting characteristic coefficient column. In this image, a column with a downward arrow is provided in advance with plural selection items, which are displayed as a pull-down menu upon selection of the arrow mark. A desired item can be entered by selection in the pull-down menu. The above-mentioned information are fetched in a step s203. A step s204 discriminates the selection of an execution button, and, if it is selected, the sequence proceeds to a step s205 to execute the flow shown in FIG. 18. If the execution button is not selected, the sequence proceeds to a step s207 for discriminating the selection of an end button. If it is selected, the present operation mode is terminated. If the end button is not selected, the sequence returns to the step s203. A step s206 discriminates the completion of operations, and, if completed, the sequence returns to the step s203. If not completed, the sequence waits in a stand-by state in the step s206. The operations in the user interface mode of the present system are executed in the above-explained manner.

In the following there will be explained, with reference to FIG. 20, the operations in the execution of the user interface mode.

When the execution of the user interface mode is selected, the system control unit 1111 reads, in a step s301, a program realizing the flow of the user interface mode from the system control data storing unit 1112, and initiates operations according to the program. At first a step s302 specifies the image input device and selects the corresponding input device gamma characteristic correcting look-up table from the input device characteristic data storing unit 1106 and sets the look-up table in the input gamma conversion unit 1102. Also the conversion matrix $M_{in}$, for converting the in-system input signals $R'_{in} G'_{in} B'_{in}$ into the in-system conversion signals XYZ, is selected according to the image input device from the input device characteristic data storing unit 1106 and is set in the image conversion matrix calculating unit 1109. Then a step s303 specifies the image display device and selects the corresponding display device gamma characteristic correcting look-up table from the display device characteristic data storing unit 1107 and sets the look-up table in the output gamma conversion unit 1104. Also the conversion matrix $M_{out}$, corresponding to the image display device and adapted for converting the in-system conversion signals XYZ into the in-system output signals $R'_{out}G'_{out}B'_{out}$, and the three stimulation values $X_{wIII}Y_{wIII}Z_{wIII}$ of the displayed white color of the display device are selected from the display device characteristic data storing unit 1107 and are set in the image conversion matrix calculating unit 1109. Then a step s304 sets the ambient lighting color temperature $CCT_{ks}$, the ambient lighting luminance $Y_{ks}$ and the ambient lighting characteristic coefficient $IH_{ks}$, obtained through the user interface, in the image conversion matrix calculating unit 1109. A step s305 sets the lighting characteristic correcting matrix and various calculation coefficients, required for the calculation of the image conversion matrix, from the conversion matrix calculation data storing unit 1108 in the image conversion matrix calculating unit 1109. Then a step s306 calculates the image conversion matrix $MTX_{gh}$ by the aforementioned method, utilizing the data set in the image conversion matrix calculating unit 1109 in the foregoing steps s302, s303, s304 and s305, and sets the obtained matrix $MTX_{gh}$ in the image conversion unit 1103.

Then the image entered by the image data input unit 1101 is converted in the input gamma conversion unit 1102, the image conversion unit 1103 and the output gamma conversion unit 1104, based on the input device gamma characteristic correcting look-up table, the display device gamma characteristic correcting look-up table and the image conversion matrix set in the steps s302, s303 and s306, and the converted image is displayed on the image display unit 1105. These operations are same as those in the foregoing normal operation mode. The above-explained operations are executed in steps s307, s308, s309, s310 and s311.

After these operations, the sequence returns to the aforementioned operations relating to the user interface.

The system of the present embodiment, provided with the means for obtaining information from the user and the image conversion matrix calculating means, through the execution of the above-described operations, allows to match the apparent colors on the object, the print and on the display regardless of the external environment such as the input device, the display device and the ambient lighting.

Figure 26:
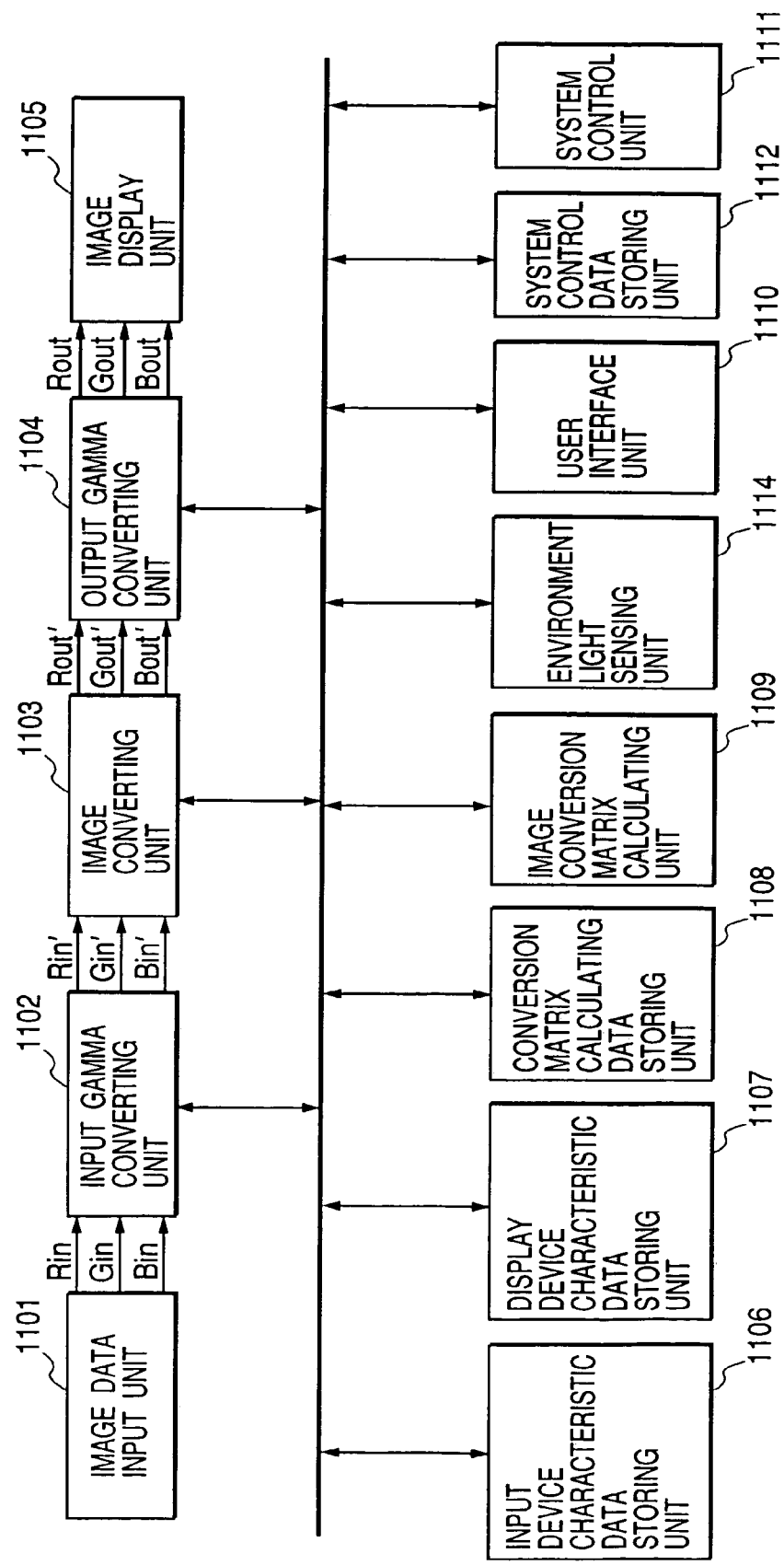
FIG. 26 is a block diagram showing a color image display system of a variation of the embodiment 1.
Figure 27:
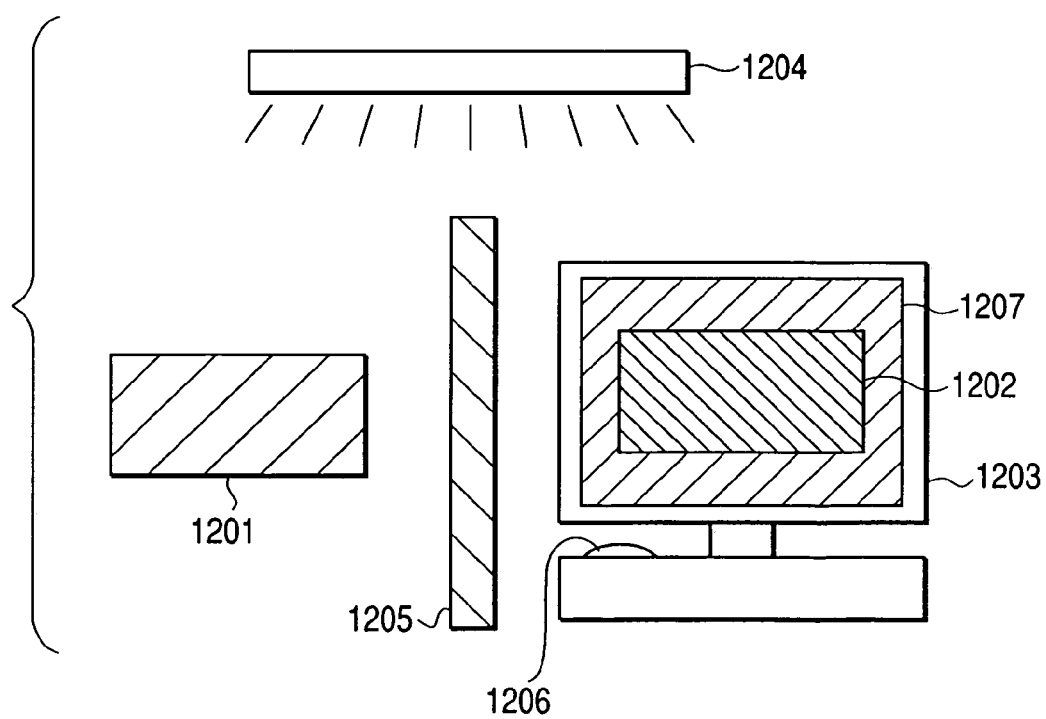
FIG. 27 is a view showing an image observing environment.

In the foregoing embodiments, the color temperature, luminance and color rendering characteristic of the ambient illuminating light are entered through the user interface unit 1110, but there may be provided an ambient light sensing unit 1114 for automatically measuring and setting these parameters of the ambient illuminating light, as shown in FIG. 26. In the configuration shown in FIG. 26, the ambient light sensing unit 1114 employs a sensor of the sensitivity characteristics shown in FIG. 12, and the output signals RGB of this sensor are processed to individually obtain the above-mentioned parameters. This configuration is substantially same as the foregoing configuration except that the above-mentioned parameters are obtained not from the user interface unit 1110 but from the ambient light sensing unit 1114, and the functions are also substantially similar. Also the above-mentioned set values may be entered independently from suitable means. Also such configuration allows to set the characteristics of the ambient illuminating light by measurement.

Furthermore, the present embodiment is capable of satisfactory signal conversion, taking into consideration the spectral characteristics of the observing environment and the color adaptation characteristics of the observer (influence of both the displayed white color and the ambient light white color on the standard white color in the observation of the displayed image), by executing the image conversion based on the spectral characteristics of the ambient illuminating light and also executing the color adapted conversion based on the standard white color in the observation of the displayed image, obtained from the ambient illuminating light and the white color of the display device.

The foregoing embodiment employs the theory of von Kries in the color adapted conversion, but there may also be applied other color adaptation estimating theories. Also the present invention is applicable to various hardware configurations and sequence processes corresponding thereto. Such sequence process may be realized into a logic circuit or a software or an algorithm within the aforementioned scope of the present invention, and the hardware or the apparatus can be realized according to such algorithm.

The present invention is further applicable to a copying apparatus or a printer provided with a previewing function, for displaying the image to be printed in advance on a monitor.

Embodiment 5

In the foregoing embodiment 4, the image conversion matrix to be utilized in the image conversion unit 1103 is obtained in the user interface unit, by the determination in the image conversion matrix calculating unit 1109 for each setting of the input device, display device, ambient lighting color temperature, ambient lighting luminance and ambient lighting characteristic coefficient.

The input device, the display device and the ambient illumination may be limited to a certain number of combinations. In such case, such combinations are finite and the image conversion matrix may be stored corresponding to each of such combinations.

The present embodiment is suitable for such case, and is realized by adding an image conversion matrix storing unit 1113 to the color image display system of the embodiment 4 shown in FIG. 15.

Figure 21:
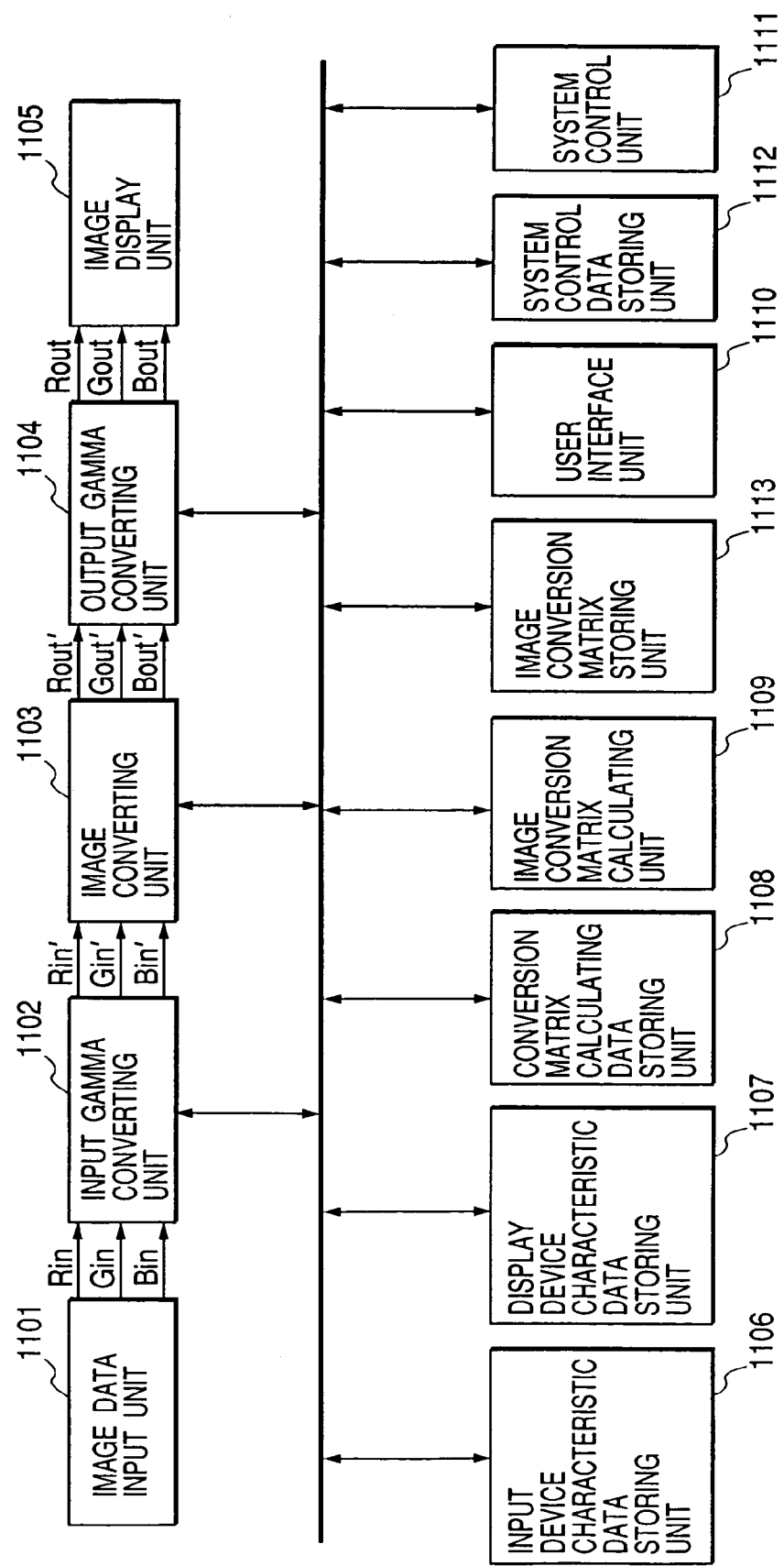
FIG. 21 is a block diagram showing a color image display system of an embodiment 5.

FIG. 21 shows the color image display system of the present embodiment.

The image conversion matrix storing unit 1113 stores the matrix, calculated in the image conversion matrix calculating unit 1109, according to the instruction of the user interface unit 1110. According to the instruction from the user interface unit 1110, the system control unit 1111 stores the image conversion matrix from the image conversion matrix calculating unit 1109 to the image conversion matrix storing unit 1113 or setting the matrix therefrom in the image conversion unit 1103.

The functions of the present embodiment are same as those of the foregoing embodiment 4, except for the addition of a step of storing the calculated image conversion matrix and a step of selecting and setting the stored image conversion matrix.

Figure 23:
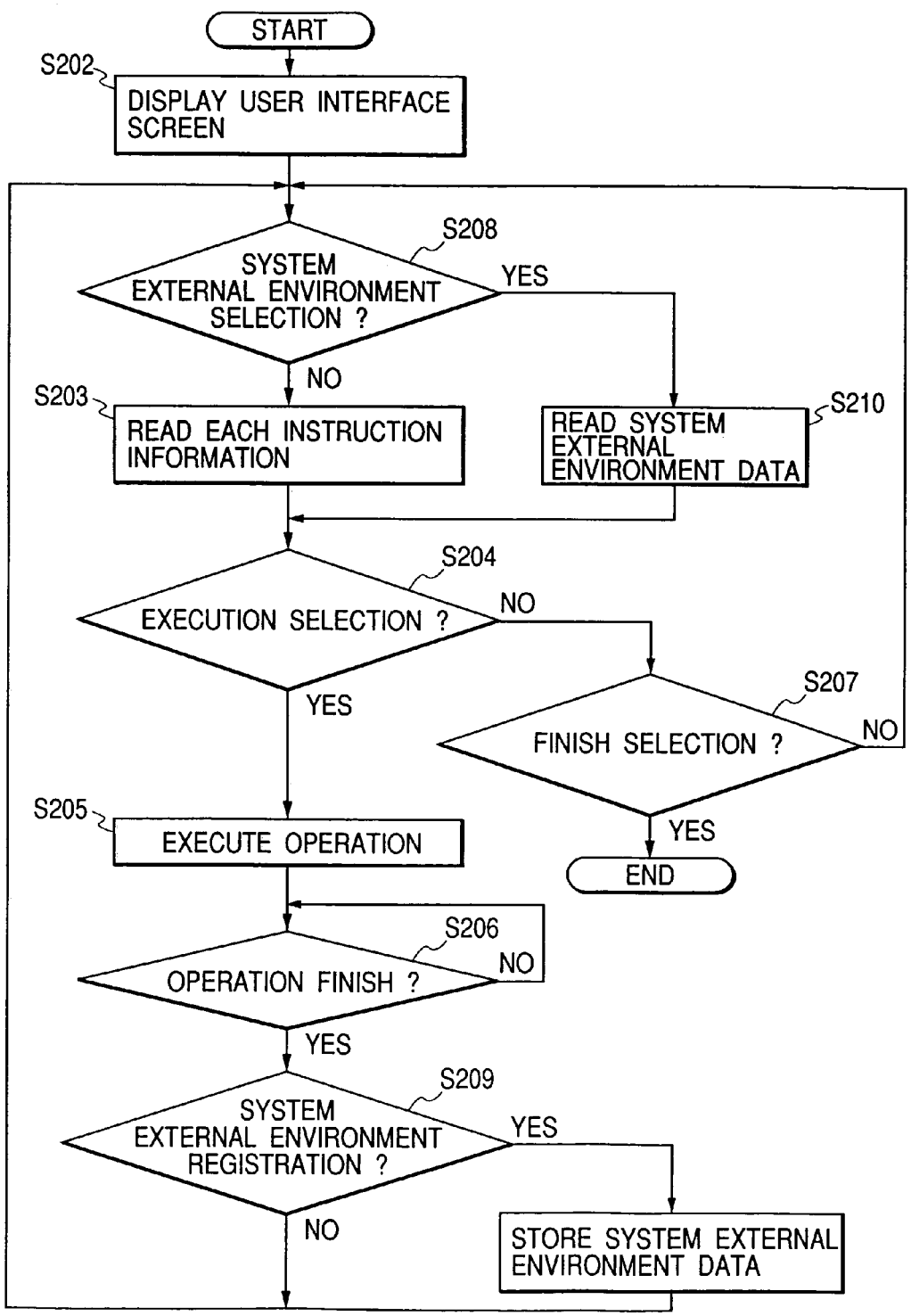
FIGS. 23 and 24 are flow charts showing the operation in the user interface mode of the embodiment 5.

FIG. 23 is a flow chart of the operations relating to the user interface of the present embodiment.

Figure 22:
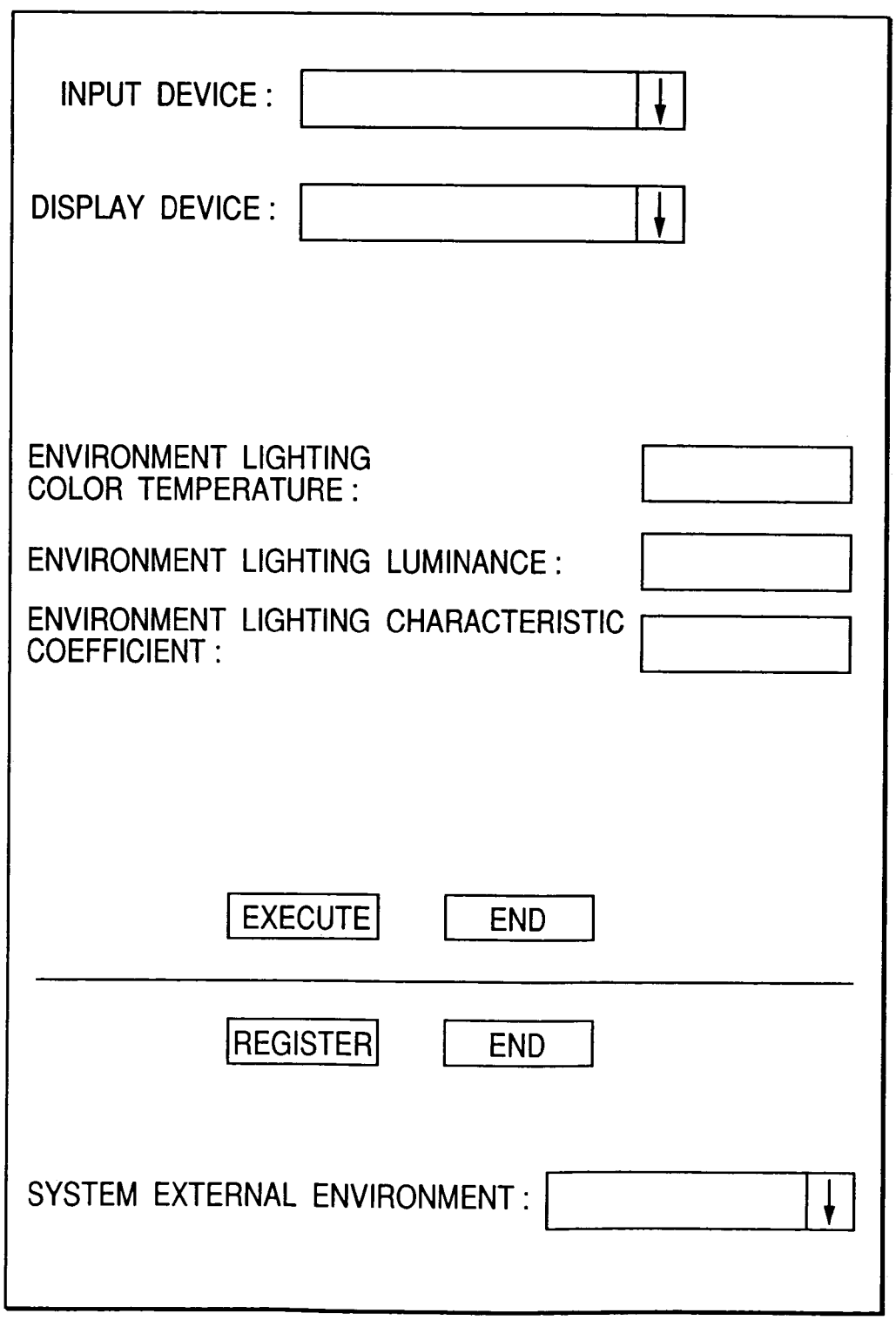
FIG. 22 is a view showing the user interface image frame of the embodiment 5.

Also FIG. 22 shows the user interface image of the present embodiment.

In comparison with the user interface image of the previous embodiment, there is added an input area for registering and selecting the external environment of the system. In this image, a column with a downward arrow is provided in advance with plural selection items, which are displayed as a pull-down menu upon selection of the arrow mark. A desired item can be entered by selection in the pull-down menu.

In the following there will be explained the functions of the present embodiment with reference to FIG. 23. When the user interface mode is accessed in the present system, a step s202 reads and displays the information of the user interface image shown in FIG. 22. On this user interface image, the user enters the input device in an input device column, the display device in a display device column, the color temperature $CCT_{ks}$ of the ambient illuminating light in an ambient lighting color temperature column, the luminance $Y_{ks}$ of the ambient illuminating light in an ambient light luminance column and the ambient lighting characteristic coefficient $IH_{ks}$ in an ambient lighting characteristic coefficient column.

Otherwise the user enters, in an input column for the system external environment, the system environment data (input device, display device and image conversion matrix mentioned above) stored in advance by means to be explained later.

The above-mentioned operations are selected according to discrimination in a step s208 whether the system external environment is selected.

If the external environment is not selected, a step s203 enters the input device from the input device column, the display device from the display device column, the color temperature $CCT_{ks}$ of the ambient illuminating light from the ambient lighting color temperature column, and the luminance $Y_{ks}$ of the ambient lighting from the ambient light luminance column and the ambient lighting characteristic coefficient $IH_{ks}$ from the ambient lighting characteristic coefficient column.

If the external environment is selected, a step s210 fetches the system environment data.

Then a step s204 discriminates the selection of an execution button, and, if it is selected, the sequence proceeds to a step s205 to execute the operations of the flow chart. If the execution button is not selected, the sequence proceeds to a step s207 for discriminating the selection of an end button. If it is selected, the present operation mode is terminated. If the end button is not selected, the sequence proceeds to a step s208. A step s206 discriminates the completion of operations, and, if completed, the sequence proceeds to a step s209. If not completed, the sequence waits in a stand-by state in the step s206.

The step s209 discriminates whether the current external environment data of the system are to be stored, and, if not, the sequence returns to the step s208.

In case the data are to be stored, a name for storing the external environment is read from the user interface image, and the external environment data are stored under such name.

The operations of the present system relating to the user interface mode are executed in the above-explained manner.

Figure 24:
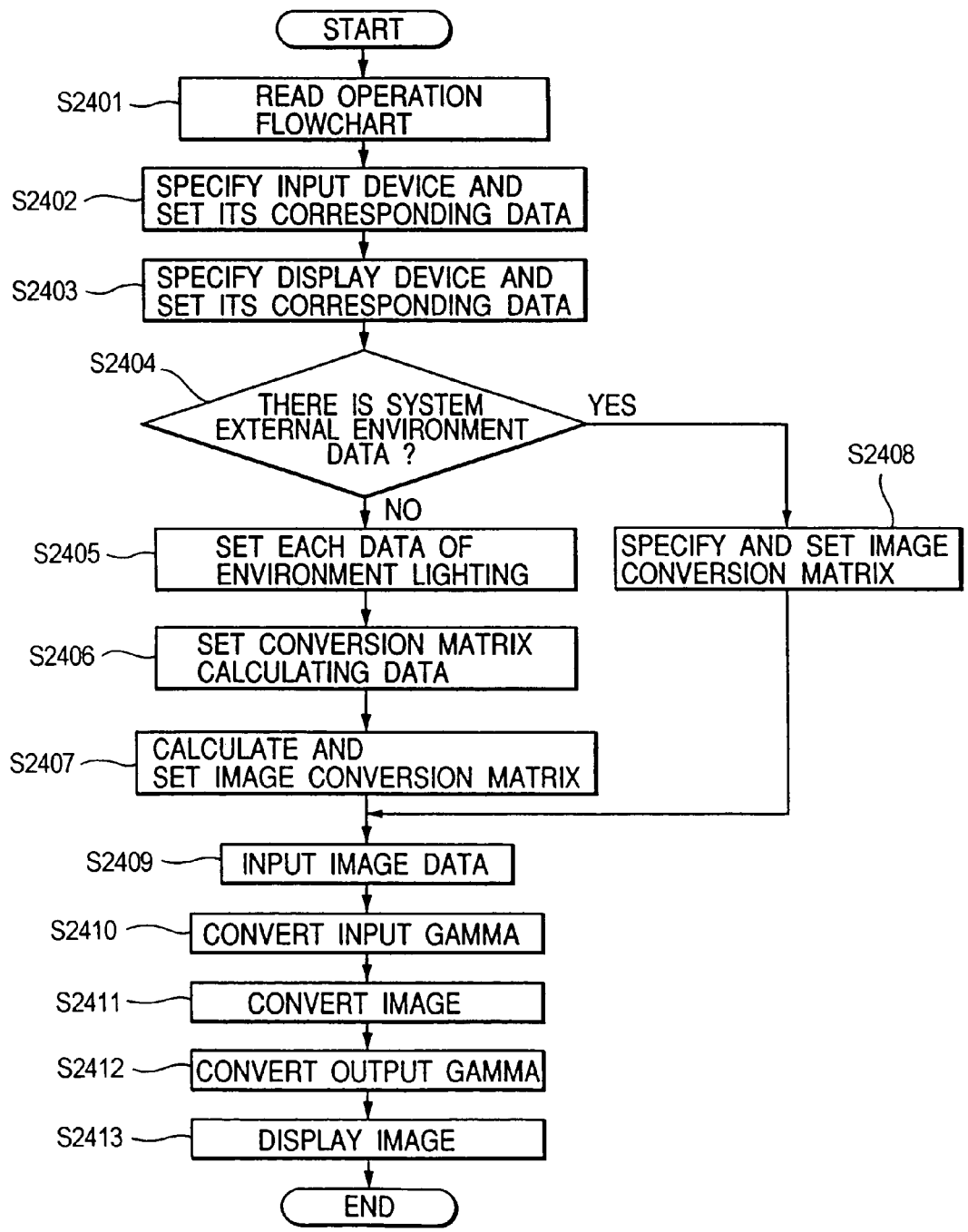

In the following description there will be explained the operations in the execution of the user interface mode, with reference to FIG. 24, which is a flow chart showing the operations in the execution of the user interface mode in the present embodiment.

Figure 20:
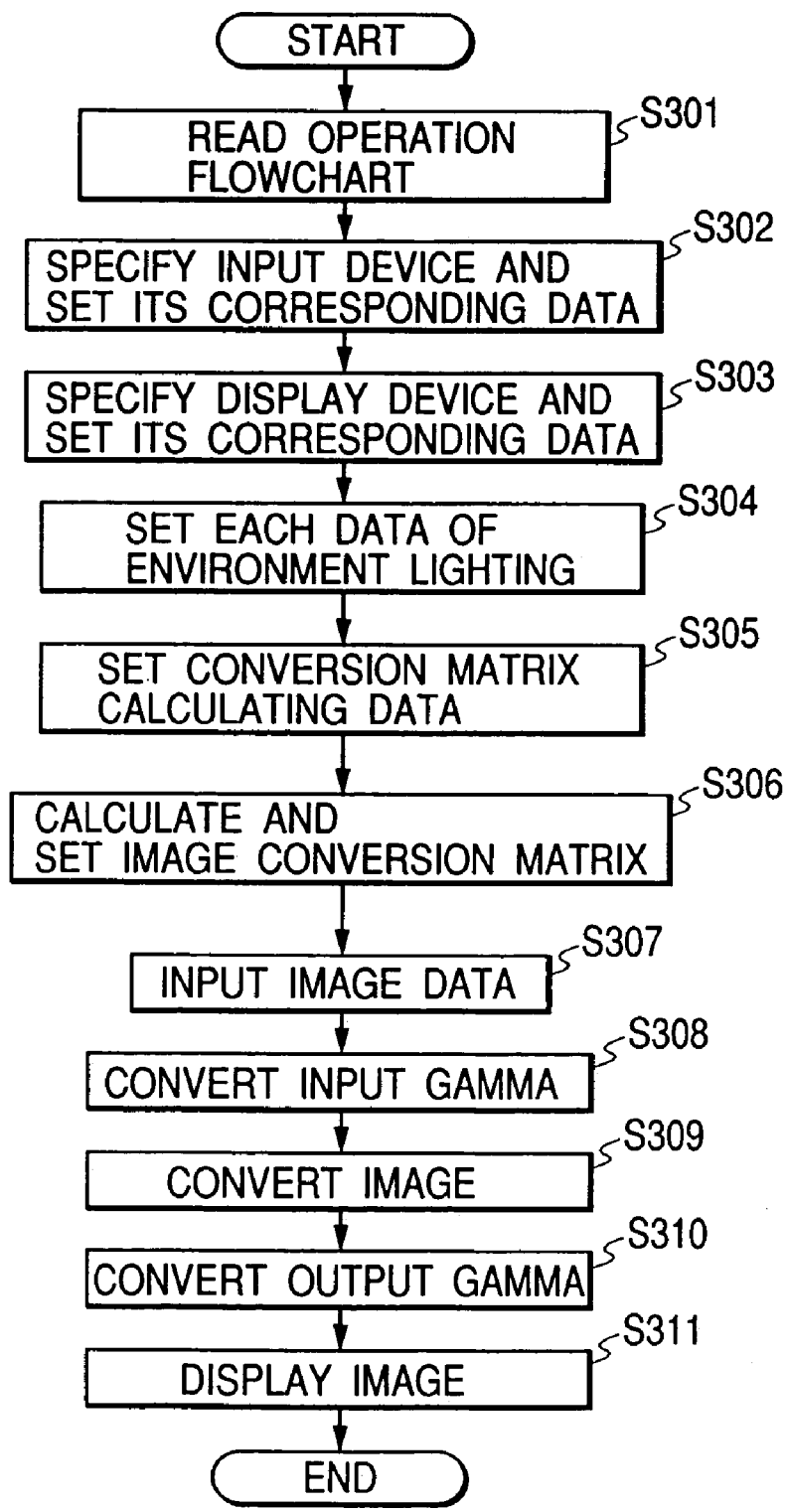
FIG. 20 is a flow chart showing the operations in the execution of the user interface mode.

Most of the operations are basically the same as those of the fourth embodiment depicted in FIG. 20. Specifically, steps S301 to S311, shown in FIG. 20, correspond with steps S2401 to S2403, S2405 to S2407 and S2409 to S2413, respectively, shown in FIG. 24, and therefore a description of these steps has been omitted. The operations depicted in FIG. 24 differ from those depicted in FIG. 20 with the presence of a branched step in which the image conversion matrix is selected from the image conversion matrix storing unit 1113 and is set in the image conversion unit 1103 (Step S2408) if there is system external environment data (Step S2404).

The system of the present embodiment, through the above explained operations and owing to the presence of the selection means by the user, the image conversion matrix calculating means and the storing means, allows to easily match the apparent colors of the object, the printed image and the image displayed on the display device under a given environment regardless of the external environment of the system such as the input device, display device and ambient illuminating light.

Embodiment 6

As in the embodiment 5, the present embodiment 6 stores the image conversion matrix corresponding to the combination of the input device, display device and ambient lighting.

FIG. 21 shows the color image display system of the present embodiment, which is obtained by adding an image conversion matrix storing unit 1113 to the color image display system of the embodiment 4 shown in FIG. 15.

The difference between the present embodiment and the embodiment 5 lies in a fact whether the image conversion matrix to be employed is directly designated in the user interface unit by the external environment input column.

Figure 25:
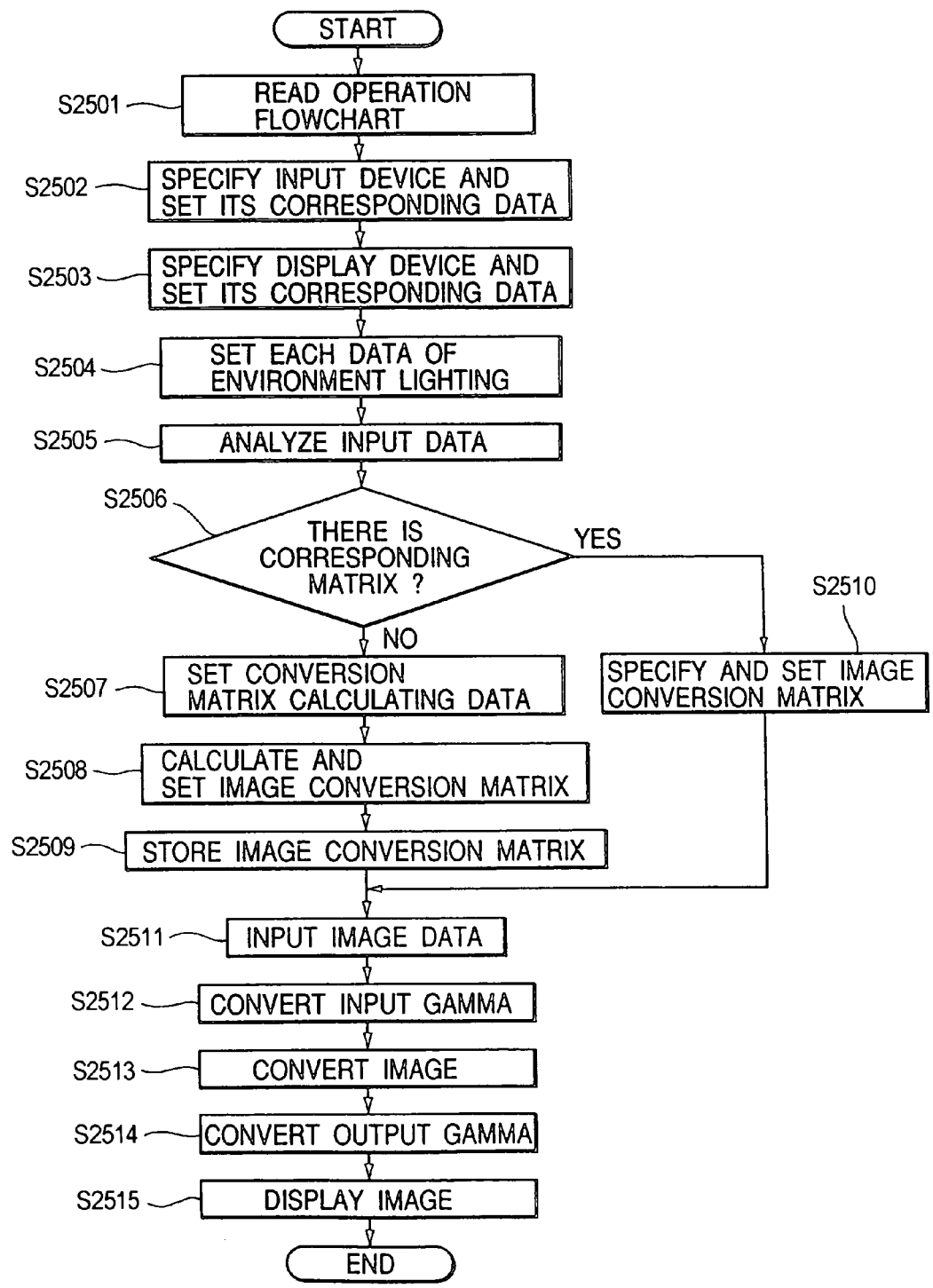
FIG. 25 is a flow chart showing the operations in the execution of the user interface mode in an embodiment 6.

In contrast to the fifth embodiment (depicted in FIG. 24) utilizing direct designation, operations of the system control unit 1111 of the present embodiment, depicted in FIG. 25, include a step of analyzing the input data of the user interface (step S2505), and if the result obtained in such analysis is same as a mark attached to the previously prepared and stored image conversion matrix (step S2506), the previous matrix is selected without calculation of the matrix anew (step S2510).

In case the image conversion matrix is calculated anew in the present embodiment, the result of analysis of the user interface input data is displayed and stored in the image conversion matrix storing unit 1113 (step S2509).

The remaining steps depicted in FIG. 25, namely steps S2501 to S2504, S2507, S2508 and S2511 to S2515, correspond with steps S301 to S311, respectively, depicted in FIG. 20, and therefore a description of these steps has been omitted.

The user interface image employed in the present embodiment is similar to that of the embodiment 1 shown in FIG. 17.

The operations of the present embodiment are substantially similar to those of the foregoing embodiment 5, except for the above-described operations.

The system of the present embodiment, through the above-explained operations and owing to the presence of the image conversion matrix calculating means and the storing means, and the user interface input data analyzing means, allows to easily match the apparent colors of the object, the printed image and the image displayed on the display device under a given environment regardless of the external environment of the system such as the input device, display device and ambient illuminating light.

As explained in the foregoing embodiments, in order to match the apparent colors in the display on the monitor and in the print, it is necessary to execute the conversion of the color signals in full consideration of the characteristics (spectral characteristics, color rendering property etc.) of the ambient light. The foregoing embodiments are different in the method of setting the data required for such conversion, and the intention of the present invention is, in an image display method, an image display apparatus and an image display system, to provide means for setting the input device, display device and ambient illuminating light, and color signal conversion means capable, based on the characteristics of thus set input device, display device and ambient illuminating light, of executing a color signal conversion based on the characteristics of the input device, a color signal conversion based on the characteristics of the ambient illuminating light, a color signal conversion including the color adaptation based on the characteristics of the ambient illuminating light and the displayed white color of the display device, and a color signal conversion based on the characteristics of the display device.

More specifically, based on the information (chromaticity, color temperature or spectral intensity (luminosity)) on the illuminating light (ambient light), there are obtained information (chromaticity, XYZ stimulation values etc.) on the white color sensed under such illuminating light and information (for example two-dimensional matrix) for converting other colors, and the color signal conversion is executed utilizing these information.

According to the foregoing embodiments, there is achieved precise conversion of the color signals corresponding to various ambient light sources, thereby attaining sufficiently precise isochromaticity for the display on the monitor and for the printed image.

Also the present invention is applicable to various hardware configurations and sequence processes corresponding thereto. Such sequence process may be realized into a logic circuit or a software or an algorithm within the aforementioned scope of the present invention, and the hardware or the apparatus can be realized according to such algorithm.

Other Embodiments

The present invention is applicable not only to a system consisting of plural equipment (for example host computer, interface equipment, reader, printer etc.) but also to an apparatus consisting of a single equipment (for example a copying apparatus or a facsimile apparatus).

The present invention also includes an embodiment of supplying a computer in an apparatus or a system, so connected with various devices as to realize the functions of the foregoing embodiments, with program codes of a software for realizing the functions of the foregoing embodiments whereby the effects of the present invention are achieved by the functions of such various devices according to the program stored in the computer of such system or apparatus.

In such case, the program codes themselves of the above-mentioned software realize the functions of the foregoing embodiments, and the program codes themselves and means for supplying the computer with such program codes, for example a memory medium storing such program codes, constitute the present invention.

The memory medium for storing the program codes can be, for example, a floppy disk, a hard disk, an optical disk, a magnetooptical disk, a CD-ROM, a magnetic tape, a non-volatile memory card or a ROM.

Also the present invention naturally includes not only a case in which the functions of the foregoing embodiments are realized by the execution of the supplied program codes by the computer but also a case in which the functions are realized by the cooperation of the program codes with the operating system of the computer or another application software.

Furthermore the present invention includes a case in which the supplied program codes are stored in an expansion board of the computer or a memory provided in an expansion unit connected to the computer and a CPU or the like provided in such expansion board or expansion unit executes all or a part of the actual process according to the instruction of such program codes thereby realizing the functions of the foregoing embodiments.

The present invention is not limited to the foregoing embodiments but is subject to any and all modifications and variations within the scope and spirit of the appended claims.

What is claimed is:

1. An image processing method for converting image data dependent on a first illuminating light into image data dependent on a second illuminating light, comprising the steps of:
   storing a conversion condition for a light source having a high color rendering property and a conversion condition for a light source having a low color rendering property;
   generating data indicating a proportion of synthesis of the stored conversion condition for the light source having the high color rendering property and the light source having the low color rendering property, corresponding to the second illuminating light;
   generating a first conversion condition from the stored conversion condition for the light source having the high color rendering property and from the stored conversion condition for the light source having the low color rendering property, according to the data indicating the proportion of synthesis;
   generating a second conversion condition for color temperature conversion, based on color temperature information of the second illuminating light;
   converting image data dependent on the first illuminating light into image data dependent on the second illuminating light using the first conversion condition and the second conversion condition; and
   displaying an image on a display unit based on the converted image data,
   wherein the conversion condition for the light source having the high color rendering property is obtained from measurement data of plural patches under the light source having the high color rendering property and measurement data of the plural patches under a standard light source, and
   the conversion condition for the light source having the low color rendering property is obtained from measurement data of plural patches under the light source having the low color rendering property and measurement data of the plural patches under the standard light source.

2. An image processing method according to claim 1, wherein data indicating proportions of plural syntheses are stored in advance according to kinds of illuminating light.

3. An image processing method according to claim 2, wherein the kind of the second illuminating light is designated by a user and the data indicating the proportion of synthesis are selected according to the designated kind of the second illuminating light.

4. An image processing method according to claim 1, wherein the data indicating the proportion of synthesis are generated according to a manual instruction of a user.

5. An image processing method according to claim 1, wherein the data indicating the proportion of synthesis are generated according to an output from a sensor for measuring illuminating light.

6. An image processing method according to claim 1, wherein the conversion data are matrix data.

7. An image processing method according to claim 1, further comprising a step of providing a preview image based on the converted image data.

8. An image processing apparatus for converting image data dependent on a first illuminating light into image data dependent on a second illuminating light, comprising:
   a data storing unit for storing a conversion condition for a light source having a high color rendering property and a conversion condition for a light source having a low color rendering property;
   a generating unit for generating data indicating a proportion of synthesis of the stored conversion conditions for the light source having the high color rendering property and the light source having the low color rendering property, corresponding to the second illuminating light;
   a first calculating unit for generating a first conversion condition from the stored conversion condition for the light source having the high color rendering property and from the stored conversion condition for the light source having the low color rendering property, according to the data indicating the proportion of synthesis;
   a second calculating unit for generating a second conversion condition based on color temperature information of the second illuminating light;
   a converting unit for converting image data dependent on the first illuminating light into image data dependent on the second illuminating light using the first conversion condition and the second conversion condition; and
   a display unit for displaying an image based on the converted image data,
   wherein the conversion condition for the light source having the high color rendering property is obtained from measurement data of plural patches under the light source having the high color rendering property and measurement data of the plural patches under a standard light source, and
   the conversion condition for the light source having the low color rendering property is obtained from measurement data of plural patches under the light source having the low color rendering property and measurement data of the plural patches under the standard light source.

9. A computer control program embodied in a computer-readable medium, for converting image data dependent on a first illuminating light into image data dependent on a second illuminating light, said program causing a computer to perform the steps of:
   storing a conversion condition for a light source having a high color rendering property and a conversion condition for a light source having a low color rendering property;
   generating data indicating a proportion of synthesis of the stored conversion conditions for the light source having the high color rendering property and the light source having the low color rendering property, corresponding to the second illuminating light;
   generating a first conversion condition from the stored conversion condition for the light source having the high color rendering property and from the stored conversion condition for the light source having the low color rendering property, according to the data indicating the proportion of synthesis;
   generating a second conversion condition based on color temperature information of the second illuminating light;
   converting image data dependent on the first illuminating light into image data dependent on the second illuminating light using the first conversion condition and the second conversion condition; and
   displaying an image on a display unit based on the converted image data,
   wherein the conversion condition for the light source having the high color rendering property is obtained from measurement data of plural patches under the light source having the high color rendering property and measurement data of the plural patches under a standard light source, and
   the conversion condition for the light source having the low color rendering property is obtained from measurement data of plural patches under the light source having the low color rendering property and measurement data of the plural patches under the standard light source.

* * * * *

UNITED STATES PATENT AND TRADEMARK OFFICE
CERTIFICATE OF CORRECTION

PATENT NO. : 7,158,144 B2
APPLICATION NO. : 09/111731
DATED : January 2, 2007
INVENTOR(S) : Yoshinobu Shiraiwa et al.

It is certified that error appears in the above-identified patent and that said Letters Patent is hereby corrected as shown below:

ON THE TITLE PAGE:
At Item (*), Notice, insert --This patent issued on a continued prosecution application filed under 37 CFR 1.53(d), and is subject to the twenty year patent term provisions of 35 U.S.C. 154(a)(2).--.

IN THE DRAWINGS:
Sheet No. 13, Figure 13, --THREE-DIMENTIONAL-- (both occurrences) should read --THREE-DIMENSIONAL--.

COLUMN 1:
Line 38, "calorimetric" should read --colorimetric--.
Line 43, "calorimetric" should read --colorimetric--.
Line 50, "calorimetric" should read --colorimetric--.
Line 61, "calorimetric" should read --colorimetric--.

COLUMN 2:
Line 17, "calorimetric" should read --colorimetric--.
Line 20, "calorimetric" should read --colorimetric--.
Line 25, "calorimetric" should read --colorimetric--.
Line 28, "calorimetric" should read --colorimetric--.
Line 29, "calorimetric" should read --colorimetric--.
Line 45, "calorimetric" should read --colorimetric--.

COLUMN 4:
Line 27, "calorimetric" should read --colorimetric--.

COLUMN 5:
Line 16, "calori-" should read --colori- --.
Line 19, "calorimetric" should read --colorimetric--.
Line 23, "calorimetric" should read --colorimetric--.
Line 54, "corresponds" should read --corresponds to--.
Line 65, "calorimetric" should read --colorimetric--.

COLUMN 6:
Line 9, "calorimetric" should read --colorimetric--.
Line 12, "calo-" should read --colo- --.
Line 14, "calorimetric" should read --colorimetric--.

COLUMN 8:
Line 1, "Von." should read --Von--.
Line 9, "Von." should read --Von--.

UNITED STATES PATENT AND TRADEMARK OFFICE
CERTIFICATE OF CORRECTION

PATENT NO. : 7,158,144 B2
APPLICATION NO. : 09/111731
DATED : January 2, 2007
INVENTOR(S) : Yoshinobu Shiraiwa et al.

It is certified that error appears in the above-identified patent and that said Letters Patent is hereby corrected as shown below:

COLUMN 9:
Line 12, "calorimetric" should read --colorimetric--.
Line 13, "calorimetric" should read --colorimetric--.
Line 52, "calorimetric" should read --colorimetric--.

COLUMN 10:
Line 52, "signals $R_{out}$ '$G_{out}$ '$B_{out}$'." should read --signals $R_{out}$ $G_{out}$ $B_{out}$.--.
Line 53: Close up the right margin.
Line 61, "$B_{out}$=$LUT_{Bout}(B_{out})$" should read --$B_{out}$=$LUT_{Bout}(B_{out}')$--.

COLUMN 11:
Line 30, "signals $R_{out}$ '$G_{out}$' $B_{out}$')" should read --signals $R_{out}$ '$G_{out}$' $B_{out}$'),--, and "values $X_{WIII}$  $Y_{WIII}$-" should read --values $X_{WIII}$  $Y_{WIII}$ $Z_{WIII}$--.
Line 31, "$_iZ_{WIII}$" should be deleted.

COLUMN 12:
Line 31, "Von." should read --Von--.

COLUMN 13:
Line 57, "ratio $IH_{ks}$" should read --ratio $IH_{ks}$.--.
Line 66, "source," should read --sources,--.

COLUMN 14:
Line 3, "source" should read --sources--.
Line 53, "values ($X'_w$, $Y'_w$)" should read --values ($x'_w$, $y'_w$)--.

Line 58, "$x'_w = \dfrac{4.6070 \cdot 10^9}{CCT_{ks}^3} + \dfrac{2.9678 \cdot 10^6}{CCT_{ks}^2} + \dfrac{0.09911 \cdot 10^3}{CCT_{ks}} 0.244063$ X"

should read

--$x'_w = \dfrac{4.6070 \cdot 10^9}{CCT_{ks}^3} + \dfrac{2.9678 \cdot 10^6}{CCT_{ks}^2} + \dfrac{0.09911 \cdot 10^3}{CCT_{ks}} + 0.244063$ X--.

Line 65, "calorimetric" should read --colorimetric--.

UNITED STATES PATENT AND TRADEMARK OFFICE
CERTIFICATE OF CORRECTION

PATENT NO.          : 7,158,144 B2
APPLICATION NO.  : 09/111731
DATED                    : January 2, 2007
INVENTOR(S)         : Yoshinobu Shiraiwa et al.

It is certified that error appears in the above-identified patent and that said Letters Patent is hereby corrected as shown below:

COLUMN 15:

Line 3, " $X'_w = \dfrac{x'_w}{y'_w} \cdot Y_{ks}$ " should read -- $X'_w = \dfrac{x_w}{y'_w} \cdot Y_{ks}$ --.

Line 21, "unit 107." should read --unit 1107.--.
Line 38, "environmental" should read --(environmental--.

Signed and Sealed this

Third Day of June, 2008

JON W. DUDAS
*Director of the United States Patent and Trademark Office*